(12) United States Patent
He et al.

(10) Patent No.: US 10,884,288 B2
(45) Date of Patent: Jan. 5, 2021

(54) POLARIZING ARTICLE AND METHOD OF FORMING A POLARIZING ARTICLE

(71) Applicant: Transitions Optical, Ltd., Tuam (IE)

(72) Inventors: Meng He, Palm Harbor, FL (US); Delwin S. Jackson, Clearwater, FL (US); Anil Kumar, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 0 days.

(21) Appl. No.: 16/471,887

(22) PCT Filed: Dec. 30, 2016

(86) PCT No.: PCT/EP2016/082916
§ 371 (c)(1),
(2) Date: Jun. 20, 2019

(87) PCT Pub. No.: WO2018/121873
PCT Pub. Date: Jul. 5, 2018

(65) Prior Publication Data
US 2020/0103571 A1     Apr. 2, 2020

(51) Int. Cl.
*G02F 1/1335*     (2006.01)
*G02B 5/30*     (2006.01)
*G02B 27/28*     (2006.01)

(52) U.S. Cl.
CPC ..... *G02F 1/133528* (2013.01); *G02B 5/3016* (2013.01); *G02B 27/288* (2013.01); *G02F 2001/133531* (2013.01)

(58) Field of Classification Search
CPC ... G02F 1/133528; G02F 2001/133531; G02B 5/3016; G02B 27/288
See application file for complete search history.

(56) References Cited

U.S. PATENT DOCUMENTS

| | | |
|---|---|---|
| 4,731,264 A | 3/1988 | Lin et al. |
| 4,756,973 A | 7/1988 | Sakagami et al. |
| | (Continued) | |

FOREIGN PATENT DOCUMENTS

| | | |
|---|---|---|
| WO | 9420581 A1 | 9/1994 |
| WO | 0033111 A1 | 6/2000 |
| | (Continued) | |

OTHER PUBLICATIONS

Brown, "Photochromism", Techniques of Chemistry, 1971, pp. 735-815, vol. 3, John Wiley and Sons, Inc., New York, New York.

(Continued)

*Primary Examiner* — Dung T Nguyen
(74) *Attorney, Agent, or Firm* — The Webb Law Firm

(57) ABSTRACT

The present invention relates to a polarizing article that includes in order: (a) a substrate; (b) a first orientation facility having a first orientation direction; (c) a first polarized layer, that includes a first dichroic fixed-tint dye and a first liquid-crystal material, and which has a first polarization axis; (d) a second orientation facility having a second orientation direction; and (e) a second polarized layer that includes a second dichroic fixed-tint dye and a second liquid-crystal material, and which has a second polarization axis. The first and second polarization axes are oriented relative to each other at an angle of greater than 0° and less than or equal to 90°. The electromagnetic absorption spectra of the first and second dichroic fixed-tint dyes are different from each other.

15 Claims, 2 Drawing Sheets

(56) References Cited

U.S. PATENT DOCUMENTS

| | | | |
|---|---|---|---|
| 4,931,220 | A | 6/1990 | Haynes et al. |
| 5,134,191 | A | 7/1992 | Takarada et al. |
| 5,231,156 | A | 7/1993 | Lin |
| 5,462,806 | A | 10/1995 | Konishi et al. |
| 5,550,661 | A | 8/1996 | Clark et al. |
| 5,645,767 | A | 7/1997 | Van Gemert |
| 5,658,501 | A | 8/1997 | Kumar et al. |
| 5,698,141 | A | 12/1997 | Kumar |
| 5,723,072 | A | 3/1998 | Kumar |
| 5,948,487 | A | 9/1999 | Sahouani et al. |
| 5,962,617 | A | 10/1999 | Slagel |
| 6,022,497 | A | 2/2000 | Kumar |
| 6,153,126 | A | 11/2000 | Kumar |
| 6,175,450 | B1 | 1/2001 | Andreani et al. |
| 6,338,808 | B1 | 1/2002 | Kawata et al. |
| 6,433,043 | B1 | 8/2002 | Misura et al. |
| 6,602,603 | B2 | 8/2003 | Welch et al. |
| 6,641,874 | B2 | 11/2003 | Kuntz et al. |
| 6,768,581 | B1 | 7/2004 | Yip et al. |
| 6,864,932 | B2 | 3/2005 | Miyatake et al. |
| 7,315,341 | B2 * | 1/2008 | Nimura ............. G02F 1/133634 349/117 |
| 7,342,112 | B2 | 3/2008 | Kumar et al. |
| 7,410,691 | B2 | 8/2008 | Blackburn et al. |
| 7,452,611 | B2 | 11/2008 | Blackburn et al. |
| 7,465,414 | B2 | 12/2008 | Knox et al. |
| 7,910,019 | B2 | 3/2011 | He et al. |
| 8,649,081 | B1 * | 2/2014 | DeMeio .................. G03C 1/73 359/241 |
| 9,030,740 | B2 | 5/2015 | DeMeio et al. |
| 9,475,901 | B2 | 10/2016 | Saha et al. |
| 2002/0039627 | A1 | 4/2002 | Ichihashi et al. |
| 2003/0045612 | A1 | 3/2003 | Misura et al. |

FOREIGN PATENT DOCUMENTS

| | | |
|---|---|---|
| WO | 2014043023 A1 | 3/2014 |
| WO | 2014043546 A1 | 3/2014 |

OTHER PUBLICATIONS

Sperling, Introduction to Physical Polymer Science, 2006, John Wiley & Sons, Inc., p. 46, 4th Edition, New York, New York (corresponds to 1986, p. 46 as listed in spec).

* cited by examiner

POLARIZING ARTICLE AND METHOD OF FORMING A POLARIZING ARTICLE

CROSS-REFERENCE TO RELATED APPLICATION

This application is the United States national phase of International Application No. PCT/EP2016/082916 filed Dec. 30, 2016, the disclosure of which is hereby incorporated by reference in its entirety.

FIELD

The present invention relates to a polarizing article and/or a method of making a polarizing article, that includes in order: a substrate; a first orientation facility having a first orientation direction; a first polarized layer that includes a first dichroic fixed-tint dye and a first liquid crystal material, and which has a first polarization axis; a second orientation facility having a second orientation direction; and a second polarized layer that includes a second dichroic fixed-tint dye and a second liquid crystal material, and which has a second polarization axis, in which the first and second polarization axes are oriented relative to each other at an angle of greater than 0° and less than or equal to 90°, and the electromagnetic absorption spectra of the first and second dichroic fixed-tint dyes are different from each other.

BACKGROUND

Conventional linearly polarizing elements, such as linearly polarizing lenses for sunglasses and linearly polarizing filters, are typically formed from unilaterally stretched polymer sheets. Accordingly, when a conventional linearly polarizing element is exposed to either randomly polarized radiation or reflected radiation of the appropriate wavelength, some percentage of the radiation transmitted through the element is linearly polarized.

In addition, conventional linearly polarizing elements are typically tinted. Typically, conventional linearly polarizing elements contain a static or fixed coloring agent and have an absorption spectrum that does not vary in response to actinic radiation. The color of the conventional linearly polarizing element will depend upon the static coloring agent used to form the element, and most commonly, is a neutral color (for example, brown, blue, or gray).

The presence of a dichroic fixed-tint in a conventional linear polarizing element can additionally result in the extraction of a particular color(s) from the polarized light that is transmitted through the element. In addition to being linearly polarized, the light transmitted through such a linear polarizing element can also provide enhanced color contrast depending on which visible color(s) is extracted and which visible colors are transmitted. Such a combination of enhanced color contrast and linear polarization can be useful in various applications, such as with optical lenses used while engaging in and/or viewing sports, shooting, spotting, operating vehicles, such as cars, motorcycles, boats, ships, and airplanes, and photographic lenses.

It would be desirable to develop new polarizing articles and/or methods of making polarizing articles that provide desirable properties, such as a combination of enhanced color contrast in addition to linear polarization. It would be further desirable that the properties, such as the degree of color enhancement, of such linearly polarizing articles, be controllably reproducible and improved.

SUMMARY

In accordance with the present invention there is provided a polarizing article that comprises, (a) a substrate having a first surface and a second surface, and (b) a first orientation facility over the first surface of the substrate, in which the first orientation facility has a first orientation direction. The polarizing article further comprises, (c) a first polarized layer comprising a first dichroic fixed-tint dye and a first liquid crystal material, in which the first polarized layer resides over the first orientation facility, such that the first orientation facility is interposed between the first surface of the substrate and the first polarized layer. The first polarized layer has a first polarization axis that is, with some embodiments, aligned substantially with the first orientation direction of the first orientation facility. The polarizing article further comprises, (d) a second orientation facility that resides over the first polarized layer, such that the first polarized layer is interposed between the first orientation facility and the second orientation facility. The second orientation facility has a second orientation direction. The polarizing article further comprises, (e) a second polarized layer comprising a second dichroic fixed-tint dye and a second liquid crystal material, in which the second polarized layer resides over the second orientation facility, such that the second orientation facility is interposed between the first polarized layer and the second polarized layer. The second polarized layer has a second polarization axis that is, with some embodiments, aligned substantially with the second orientation direction of the second orientation facility. The first polarization axis of the first polarized layer and the second polarization axis of the second polarized layer are oriented relative to each other at an angle of greater than 0° and less than 90°. The first dichroic fixed-tint dye has a first electromagnetic absorption spectrum, the second dichroic fixed-tint dye has a second electromagnetic absorption spectrum, and the first electromagnetic absorption spectrum and the second electromagnetic absorption spectrum are different from each other. The polarizing article can be prepared by the method of the present invention.

In accordance with the present invention, there is further provided a method of forming a polarizing article that comprises, (a) providing a substrate comprising a first surface and a second surface, and (b) forming a first orientation facility over the first surface of the substrate, in which the first orientation facility has a first orientation direction. The method further comprises, (c) forming, over the first orientation facility, a first polarized layer comprising a first dichroic fixed-tint dye and a first liquid crystal material, and aligning the first polarized layer at least partially with the first orientation direction of the first orientation facility, in which the first polarized layer has a first polarization axis that is aligned substantially with the first orientation direction of the first orientation facility. In the next step (d), a second orientation facility is formed over the first polarized layer, in which the second orientation facility has a second orientation direction. The method further comprises, (e) forming, over the second orientation facility, a second polarized layer comprising a second dichroic fixed-tint dye and a second liquid crystal material, and aligning the second polarized layer at least partially with the second orientation direction of the second orientation facility, in which the second polarized layer has a second polarization axis that is aligned substantially with the second orientation direction of the second orientation facility. The first polarization axis of the first polarized layer and the second polarization axis of the second polarized layer are oriented relative to each other at an angle of greater than 0° and less than or equal to 90°. The first dichroic fixed-tint dye has a first electromagnetic absorption spectrum, the second dichroic fixed-tint dye has a second electromagnetic absorption spectrum, and the first electromagnetic absorption spectrum and the second electromagnetic absorption spectrum are different from each other.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1 and 2 like characters refer to the same components and/or elements, as the case may be, unless otherwise stated.

DETAILED DESCRIPTION

Figure 1:
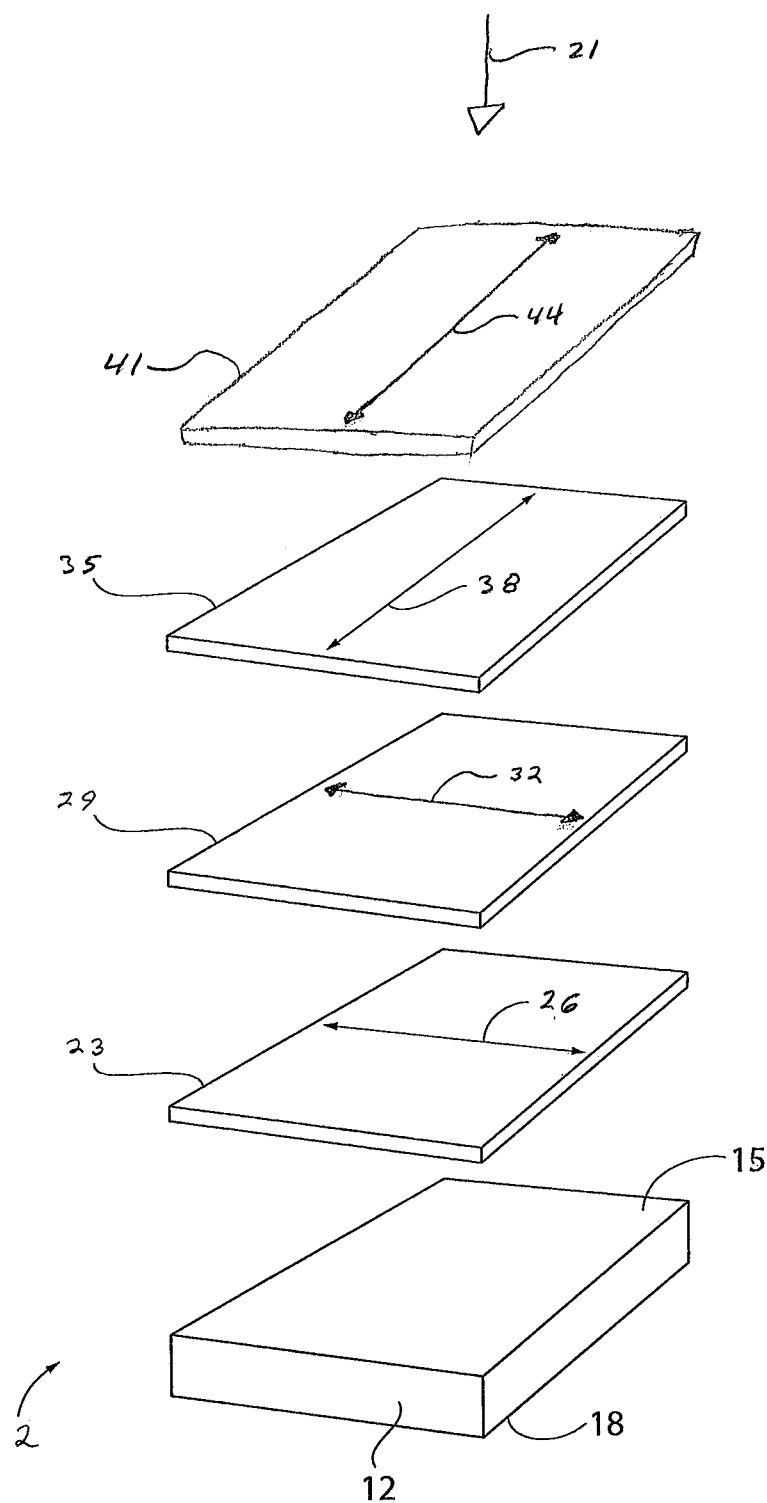
FIG. 1 is a representative exploded perspective view of a polarizing article according to the present invention.

As used herein, the articles "a," "an," and "the" include plural referents unless otherwise expressly and unequivocally limited to one referent.

As used herein, the term "a first dichroic fixed-tint dye" means at least one first dichroic fixed-tint dye. As used herein, the term "a second dichroic fixed-tint dye" means at least one second dichroic fixed-tint dye.

As used herein, the term "a first liquid crystal material" means at least one first liquid crystal material. As used herein, the term "a second liquid crystal material" means at least one second liquid crystal material.

As used herein, the term "dichroic" means capable of absorbing one of two orthogonal plane polarized components of at least transmitted radiation more strongly than the other.

As used herein the term "absorption ratio" refers to the ratio of the absorbance of radiation linearly polarized in a first plane to the absorbance of the same wavelength radiation linearly polarized in a plane orthogonal to the first plane, in which the first plane is taken as the plane with the highest absorbance.

As used herein, and unless otherwise indicated, "percent transmittance" can be determined using an art-recognized instrument, such as an ULTRASCAN PRO spectrometer obtained commercially from HunterLab, in accordance with instructions provided in the spectrometer user manual.

As used herein, the term "photosensitive material" means materials that physically or chemically respond to electromagnetic radiation, including, but not limited to, phosphorescent materials and fluorescent materials.

As used herein, the term "non-photosensitive materials" means materials that do not physically or chemically respond to electromagnetic radiation with regard to the visually observed color thereof, including, but not limited to, fixed-tint dyes.

As used herein the term "linearly polarize" means to confine the vibrations of the electric vector of electromagnetic waves, such as light waves, to one direction or plane.

As used herein, the term "fixed-tint dye" and related terms, such as "fixed-colorant," "static colorant," "fixed dye," "static dye" means dyes that are: non-photosensitive materials, which do not physically or chemically respond to electromagnetic radiation with regard to the visually observed color thereof and which do not have dichroic properties.

As used herein, the term "dichroic fixed-tint dye" means a fixed-tint dye that has dichroic properties, and which correspondingly has, (i) a visually observed color that is fixed, and (ii) dichroic properties.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "photochromic" and similar terms, such as "photochromic compound" means having an absorption spectrum for at least visible radiation that varies in response to absorption of at least actinic radiation. Further, as used herein the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state," to a second state, for example a "colored state," in response to actinic radiation, and reverting back to the first state in response to thermal energy. The term "non-thermally reversible photochromic compounds/materials" as used herein means compounds/materials capable of converting from a first state, for example a "clear state," to a second state, for example a "colored state," in response to actinic radiation, and reverting back to the first state in response to actinic radiation of substantially the same wavelength(s) as the absorption(s) of the colored state (e.g., discontinuing exposure to such actinic radiation).

As used herein to modify the term "state," the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, photochromic compounds can have a different absorption spectrum in each of the first and second state. For example, while not limiting herein, a photochromic compound can be clear in the first state and colored in the second state. Alternatively, a photochromic compound can have a first color in the first state and a second color in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "display" means the visible or machine-readable representation of information in words, numbers, symbols, designs or drawings. Non-limiting examples of display elements include screens, monitors, and security elements, such as security marks.

As used herein the term "window" means an aperture adapted to permit the transmission of radiation therethrough. Non-limiting examples of windows include automotive and aircraft transparencies, windshields, filters, shutters, and optical switches.

As used herein the term "mirror" means a surface that specularly reflects a large fraction of incident light.

As used herein the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the terms "formed over," "deposited over," "provided over," "applied over," residing over," or "positioned over," means formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein the term "coating" means a supported film derived from a liquid or solid particulate flowable composition, which may or may not have a uniform thickness, and specifically excludes polymeric sheets. For purposes of non-limiting illustration, an example of solid particulate flowable composition is a powder coating composition. The first polarized layer, second polarized layer, and optional further layers, such as an optional primer layer, and an optional topcoat layer, of the polarizing articles of the present invention can, in some embodiments, each independently be a coating or formed from a coating composition.

As used herein the term "sheet" means a pre-formed film having a generally uniform thickness that is capable of self-support.

As used herein the term "connected to" means in direct contact with an object or indirect contact with an object through one or more other structures or materials, at least one of which is in direct contact with the object. For purposes of non-limiting illustration, the first orientation facility, with some embodiments for example, can be in direct contact (e.g., abutting contact) with at least a portion of the first surface of the substrate, or it can be in indirect contact with at least a portion of the first surface of the substrate through one or more other interposed structures or materials, such as a primer layer and/or a monomolecular layer of a coupling or adhesive agent. For example, although not limiting herein, the first orientation facility, with some embodiments, can be in contact with one or more other interposed coatings, polymer sheets or combinations thereof, at least one of which is in direct contact with at least a portion of the substrate, such as the first surface of the substrate.

Other than in the operating examples, or where otherwise indicated, all numbers expressing quantities of ingredients, reaction conditions, and so forth used in the specification and claims are to be understood as modified in all instances by the term "about."

The polarizing articles of the present invention include a substrate. Substrates of the polarizing articles of the present invention include, but are not limited to, substrates formed from (or including) organic materials, inorganic materials, or combinations thereof (for example, composite materials). Non-limiting examples of substrates that can be used in accordance with various non-limiting embodiments disclosed herein are described in more detail below.

Non-limiting examples of organic materials that can be used to form the substrate of the present polarizing articles and method, include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate can, with some embodiments, be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Other non-limiting examples of organic materials suitable for use in forming the substrate of the polarizing articles and methods of the present invention include both synthetic and natural organic materials, including without limitation: opaque or transluscent polymeric materials, natural and synthetic textiles, and cellulosic materials such as, paper and wood.

Non-limiting examples of inorganic materials suitable for use in forming the substrate of the polarizing articles and method of the present invention include glasses, minerals, ceramics, and metals. For example, with some non-limiting embodiments, the substrate can include glass. In other non-limiting embodiments, the substrate can have a reflective surface, for example, a polished ceramic substrate, metal substrate, or mineral substrate. In other non-limiting embodiments, a reflective coating or layer can be deposited or otherwise applied to a surface of an inorganic or an organic substrate to make it reflective or to enhance its reflectivity.

Further, according to certain non-limiting embodiments disclosed herein, the substrate can have a protective coating, such as, but not limited to, an abrasion-resistant coating, such as a "hardcoat," on its exterior surfaces. For example, commercially available thermoplastic polycarbonate ophthalmic lens substrates are often sold with an abrasion-resistant coating already applied to its exterior surfaces because these surfaces tend to be readily scratched, abraded or scuffed. An example of such a lens substrate is the GENTEX™ polycarbonate lens (available from Gentex Optics). Therefore, as used herein the term "substrate" includes a substrate having a protective coating, such as but not limited to an abrasion-resistant coating, on its surface(s).

Still further, the substrate of the polarizing articles and method of the present invention can be selected from untinted (or non-tinted) substrates, substrates that include one or more fixed-tint dyes, substrates that include one or more photochromic compounds, or substrates that include one or more fixed-tint dyes and one or more photochromic compounds.

As used herein with reference to substrates the term "untinted" means substrates that are essentially free of coloring agent additions (such as, but not limited to, fixed-tint dyes and/or photochromic compounds) and have an absorption spectrum for visible radiation that does not vary significantly in response to actinic radiation. Further, with reference to substrates the term "tinted" means substrates that have a coloring agent addition (such as, but not limited to, fixed-tint dyes and/or photochromic compounds).

As used herein with the term "photochromic" with regard to the substrate, means substrates having an absorption spectrum for visible radiation that varies in response to at least actinic radiation. Further, as used herein with regard to the substrate, the term "fixed-tint dye/photochromic" means substrates containing a fixed-tint dye as well as a photochromic compound, and having an absorption spectrum for visible radiation that varies in response to at least actinic radiation. Thus, for example and without limitation, a fixed-tint dye/photochromic substrate can have a first color characteristic of the fixed-tint dye and a second color characteristic of the combination of the fixed-tint dye the photochromic compound when exposed to actinic radiation.

With some embodiments the substrate of the polarizing articles and method of the present invention includes at least one fixed-tint dye. The optional fixed-tint dye of the substrate, with some embodiments, comprises at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

The fixed-tint dye, with some embodiments, can be present in the substrate in amounts sufficient to provide a desired color and percent transmittance of actinic radiation, such as visible light. The fixed-tint dye can be incorporated into the substrate during and/or after formation of the substrate. For purposes of non-limiting illustration, when the substrate is formed from a polymer composition, the fixed-tint dye can be mixed with the polymer composition from which the substrate is formed. With some embodiments, one or more surfaces (such as the first and/or second surfaces) of the substrate can be imbibed with the fixed-tint dye using art-recognized imbibition methods. The fixed-tint dye can be present in the substrate in varying amounts to provide the intended effect. With some embodiments, the fixed-tint dye is present in the substrate in an amount of from 0.001 to 10 percent by weight, or from 0.01 to 15 percent by weight, or from 0.1 to 2.5 percent by weight, the percent weights in each case being based on the total weight of the substrate.

The substrate, with some embodiments, includes at least one photochromic compound, which can be selected from thermally reversible photochromic compounds and/or non-thermally reversible photochromic compounds. Classes of photochromic compounds from which the photochromic compound can be selected include, but are not limited to, pyrans, oxazines, and fulgides. With some embodiments, the photochromic compound is selected from naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, organo-metal dithizonates, fulgides, fulgimides and mixtures of two or more such photochromic compounds.

Non-limiting examples of thermally reversible photochromic pyrans from which the photochromic compound can be chosen include benzopyrans, naphthopyrans, e.g., naphtho[1,2-b]pyrans, naphtho[2,1-b]pyrans, indeno-fused naphthopyrans, such as those disclosed in U.S. Pat. No. 5,645,767, and heterocyclic-fused naphthopyrans, such as those disclosed in U.S. Pat. Nos. 5,723,072, 5,698,141, 6,153,126, and 6,022,497, which are hereby incorporated by reference; spirofluoreno[1,2-b]pyrans, such as spiro-9-fluoreno[1,2-b]pyrans; phenanthropyrans; quinopyrans; fluoroanthenopyrans; spiropyrans, e.g., spiro(benzindoline)naphthopyrans, spiro(indoline)benzopyrans, spiro(indoline)naphthopyrans, spiro(indoline)quinopyrans and spiro(indoline)pyrans. More specific examples of naphthopyrans and the complementary organic photochromic substances are described in U.S. Pat. No. 5,658,501, which are hereby specifically incorporated by reference herein. Spiro(indoline)pyrans are also described in the text, *Techniques in Chemistry*, Volume III, "Photochromism", Chapter 3, Glenn H. Brown, Editor, John Wiley and Sons, Inc., New York, 1971, which is hereby incorporated by reference.

Non-limiting examples of photochromic oxazines from which the photochromic compound can be chosen include benzoxazines, naphthoxazines, and spiro-oxazines, e.g., spiro(indoline)naphthoxazines, spiro(indoline)pyridobenzoxazines, spiro(benzindoline)pyridobenzoxazines, spiro(benzindoline)naphthoxazines, spiro(indoline)benzoxazines, spiro(indoline)fluoranthenoxazine, and spiro(indoline)quinoxazine. Non-limiting examples of photochromic fulgides from which the photochromic compound can be chosen include: fulgimides, and the 3-furyl and 3-thienyl fulgides and fulgimides, which are disclosed in U.S. Pat. No. 4,931,220 (which are hereby specifically incorporated by reference) and mixtures of any of the aforementioned photochromic materials/compounds.

With some embodiments, the photochromic compound is present in the substrate in an amount of from 0.001 to 10 percent by weight. For example, the photochromic compound can be present in the substrate in an amount of from 0.01 to 5 percent by weight. For example, the photochromic compound can be present in the substrate in an amount of from 0.1 to 2.5 percent by weight. The percent weights in each case being based on the total weight of the substrate.

With some embodiments of the present invention, the polarizing article, including but not limited to the substrate, the first orientation facility, the first polarized layer, the second orientation facility, the second polarized layer, and any optional layers, such as a primer layer, a birefringent layer, a topcoat layer, a hardcoat layer, and antireflective layer(s), are in each case free of and do not include a photochromic-dichroic compound. Photochromic-dichroic compounds have both photochromic and dichroic properties and typically include, (a) at least one photochromic group or portion, such as a pyran, oxazine, or fulgide group, and (b) at least one lengthening group that is attached to the photochromic group. Photochromic-dichroic compounds are described in further detail in U.S. Pat. No. 7,342,112 B1 at column 5, line 35 to column 14, line 54; and Table 1.

With reference to FIG. 1, and for purposes of non-limiting illustration, a polarizing article 2 according to some embodiments of the present invention is depicted. Polarizing article 2 includes a substrate 12 that has a first surface 15 and a second surface 18. First surface 15 of substrate 12, with some embodiments, faces incident actinic radiation depicted by arrow 21. Polarizing article 2 further includes a first orientation facility 23 that is positioned (or resides) over first surface 15 of substrate 12. First orientation facility 23 has a first orientation direction depicted by double headed arrow 26.

Polarizing article 2 further includes a first polarized layer 29 that is positioned (or resides) over first orientation facility 23. First orientation facility 23 is interposed between first surface 15 of substrate 12 and first polarized layer 29. First polarized layer 29 includes a first dichroic fixed-tint dye and a first liquid crystal material. First polarized layer 29 is aligned at least partially with the first orientation direction 26 of first orientation facility 23. First polarized layer 29 has a first polarization axis depicted by double headed arrow 32. The first polarization axis 32 of first polarized layer 29 is, with some embodiments, aligned substantially with (and is substantially parallel with) the first orientation direction 26 of underlying first orientation facility 23.

Polarizing article 2 further includes a second orientation facility 35 that is positioned over first polarized layer 29. The second orientation facility 35 has a second orientation direction depicted by double headed arrow 38.

Polarizing article 2 further includes a second polarized layer 41 that is positioned over the second orientation facility 35. The second orientation facility 35 is interposed between first polarized layer 29 and second polarized layer 41. The second polarized layer 41 includes a second dichroic fixed-tint dye and a second liquid crystal material. Second polarized layer 41 is aligned at least partially with the second orientation direction 38 of the second orientation facility 35. Second polarized layer 41 has a second polarization axis depicted by double headed arrow 44. The second polarization axis 44 of second polarized layer 41 is, with some embodiments, aligned substantially with (and is substantially parallel with) the second orientation direction 38 of the underlying second orientation facility 35.

The first polarization axis 32 of the first polarization layer 29 and the second polarization axis 44 of the second polarization layer 41 are oriented relative to each other at an angle of greater than 0° and less than or equal to 90°. As depicted in FIG. 1, the first polarization axis 32 and the second polarization axis 44 are oriented relative to each other at an angle that is substantially equal to 90°.

The polarizing articles of the present invention include a first orientation facility that resides over the first surface of the substrate, in which the first orientation facility has a first orientation direction. The first polarized layer, which resides over the first orientation facility, is at least partially aligned by interaction with the underlying first orientation facility, with some embodiments. More particularly, the first dichroic fixed-tint dye and the first liquid crystal material of the first polarized layer are each at least partially aligned by interaction with the underlying first orientation facility, with some embodiments.

As used herein the term "orientation facility" means a facility that can facilitate the positioning of one or more other structures that are exposed, directly and/or indirectly, to at least a portion thereof. As used herein the term "order" means bring into a suitable arrangement or position, such as aligning with another structure or material, or by some other force or effect. Thus, as used herein the term "order" encompasses both contact methods of ordering a material, such as by aligning with another structure or material, and non-contact methods of ordering a material, such as by exposure to an external force or effect. The term "order" also encompasses combinations of contact and non-contact methods.

For purposes of non-limiting illustration, the first dichroic fixed-tint dye of the first polarized layer, that is at least partially aligned by interaction with the first orientation facility, can be at least partially aligned such that the long-axis of the first dichroic fixed-tint dye is essentially parallel to at least the first orientation direction of the first orientation facility. With some embodiments, the first dichroic fixed-tint dye and/or the first liquid crystal material, that are each at least partially aligned by interaction with first orientation facility, is bound to or reacted with the first orientation facility.

As used herein with reference to the order or alignment of a material or structure, the term "direction" refers to the predominant arrangement or orientation of the material, compound or structure. Further, it will be appreciated by those skilled in the art that a material, compound or structure can have a direction even though there is some variation within the arrangement of the material, compound or structure, provided that the material, compound or structure has at least one predominate arrangement.

The first orientation facility and the second orientation facility are each independently selected, with some embodiments, from: a layer comprising an alignment medium; a stretched polymer layer; a treated surface; and combinations thereof.

Examples of suitable alignment media that can be used in conjunction with the first and second orientation facilities include, but are not limited to, liquid crystal materials, photo-orientation materials, and rubbed-orientation materials. Methods of ordering at least a portion of the alignment medium are described herein below in further detail.

The alignment medium of the orientation facility can be or include a liquid crystal material, and the orientation facility can be referred to as a liquid crystal orientation facility or layer. Liquid crystal materials, because of their structure, are generally capable of being ordered or aligned so as to take on an orientation direction (such as a first orientation direction with regard to the first orientation facility, or a second orientation direction with regard to the second orientation facility). More specifically, because liquid crystal molecules have rod- or disc-like structures, a rigid long axis, and strong dipoles, liquid crystal molecules can be ordered or aligned by interaction with an external force or another structure such that the long axis of the molecules takes on an orientation that is generally parallel to a common axis.

Classes of liquid crystal materials that can be independently used as or as part of the alignment media of the first and second orientation facilities include, but are not limited to, anisotropic liquid crystal materials, isotropic liquid crystal materials, thermotropic liquid crystal materials, lyotropic liquid crystal materials, and combinations of two or more thereof. The liquid crystal materials of the first and second orientation facilities can in each case independently display at least one of a nematic phase, a semectic phase, a chiral nematic phase (i.e., a cholesteric phase), a discotic phase (including chiral discotic), a discontinuous cubic phase, a hexagonal phase, a bicontinuous cubic phase, a lamellar phase, a reverse hexagonal columnar phase, and an inverse cubic phase.

With some embodiments, the liquid crystal materials that can be independently used as or as part of the alignment media of the first and second orientation facilities are selected from thermotropic liquid crystal materials, which exhibit a liquid-crystal phase transition(s) as a function of temperature.

For purposes of non-limiting illustration, it is possible to align the molecules of a liquid crystal material with a magnetic field, an electric field, linearly polarized infrared radiation, linearly polarized ultraviolet radiation, linearly polarized visible radiation, and/or shear forces. It is also possible to align liquid crystal molecules with an oriented surface. For purposes of non-limiting illustration, liquid crystal molecules can be applied to a surface that has been oriented, for example by rubbing, grooving, or photo-alignment methods, and subsequently aligned such that the long axis of each of the liquid crystal molecules takes on an orientation that is generally parallel to the direction of orientation of the surface. Examples of liquid crystal materials suitable for use as alignment media include, but are not limited to, liquid crystal polymers, liquid crystal pre-polymers, liquid crystal monomers, and liquid crystal mesogens. As used herein the term "pre-polymer" means partially polymerized materials.

Classes of liquid crystal monomers that can be independently used as or as part of the alignment media of the first and second orientation facilities include, but are not limited to, mono- as well as multi-functional liquid crystal monomers. The liquid crystal monomers can, with some embodiments, be selected from crosslinkable liquid crystal monomers, such as photo-crosslinkable liquid crystal monomers. As used herein the term "photo-crosslinkable" means a material, such as a monomer, a pre-polymer or a polymer, that can be crosslinked on exposure to actinic radiation. For example, photo-crosslinkable liquid crystal monomers include, but are not limited to, those liquid crystal monomers that are crosslinkable on exposure to ultraviolet radiation and/or visible radiation, either with or without the use of polymerization initiators, such as photo-polymerization initiators.

Examples of crosslinkable liquid crystal monomers, that can be independently used as or as part of the alignment media of the first and second orientation facilities, include, but are not limited to, liquid crystal monomers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and combinations thereof. Examples of photo-crosslinkable liquid crystal monomers, that can be independently used as or as part of the alignment media of the first and second orientation facilities, include, but are not limited to, liquid crystal monomers having functional groups chosen from acrylates, methacrylates, alkynes, epoxides, thiols, and combinations thereof.

Liquid crystal polymers and pre-polymers, that can be independently used as or as part of the alignment media of the first and second orientation facilities, include, but are not limited to, main-chain liquid crystal polymers and pre-polymers and side-chain liquid crystal polymers and pre-polymers. With main-chain liquid crystal polymers and pre-polymers, rod- or disc-like liquid crystal mesogens are primarily located within the polymer backbone. With side-chain liquid crystal polymers and pre-polymers, the rod- or disc-like liquid crystal mesogens are primarily located within the side chains of the polymer. Additionally, the liquid crystal polymer or pre-polymer can be cross-linkable, and further can be photo-crosslinkable.

Examples of cross-linkable liquid crystal polymers and pre-polymers, that can be independently used as or as part of the alignment media of the first and second orientation facilities, include, but are not limited to, main-chain and side-chain polymers and pre-polymers having functional groups chosen from acrylates, methacrylates, allyl, allyl ethers, alkynes, amino, anhydrides, epoxides, hydroxides, isocyanates, blocked isocyanates, siloxanes, thiocyanates, thiols, urea, vinyl, vinyl ethers, and blends thereof. Examples of photo-crosslinkable liquid crystal polymers and pre-polymers, that can be independently used as or as part of the alignment media of the first and second orientation facilities, include, but are not limited to, those polymers and pre-polymers having functional groups chosen from acrylates, methacrylates, alkynes, epoxides, thiols, and combinations thereof.

Liquid crystal mesogens, that can be independently used as or as part of the alignment media of the first and second orientation facilities, include, but are not limited to, thermotropic liquid crystal mesogens and lyotropic liquid crystal mesogens. Additional classes of liquid crystal mesogens, that can be independently used as or as part of the alignment media of the first and second orientation facilities, include, but are not limited to, columatic (or rod-like) liquid crystal mesogens and discotic (or disc-like) liquid crystal mesogens.

With some embodiments, the alignment medium of the first and second orientation facilities, each independently include: (i) liquid crystal oligomers and/or polymers prepared at least in part from the monomeric mesogenic compounds; and/or (ii) the mesogenic compounds, in each case as disclosed in Table 1 of U.S. Pat. No. 7,910,019 B2 at columns 43-90 thereof, which disclosure is incorporated herein by reference.

Examples of photo-orientation materials, that can be independently used as or as part of the alignment media of the first and second orientation facilities include, but are not limited to, photo-orientable polymer networks. More specific examples of photo-orientable polymer networks include, but are not limited to, azobenzene derivatives, cinnamic acid derivatives, coumarine derivatives, ferulic acid derivatives, and polyimides. With some embodiments, the alignment medium of each of the first and second orientation facilities can independently include an at least partially ordered photo-orientable polymer network chosen from azobenzene derivatives, cinnamic acid derivatives, coumarine derivatives, ferulic acid derivatives, and/or polyimides. Examples of cinnamic acid derivatives, that can be independently included in the alignment medium of the first and second orientation facilities, include, but are not limited to, polyvinyl cinnamate and polyvinyl esters of paramethoxycinnamic acid.

As used herein the term "rubbed-orientation material" means a material that can be at least partially ordered by rubbing at least a portion of a surface of the material with another suitably textured material. For example, the rubbed-orientation material can be rubbed with a suitably textured cloth or a velvet brush. Examples of rubbed-orientation materials, that can be independently included in the alignment media of the first and second orientation facilities, include, but are not limited to, (poly)imides, (poly)siloxanes, (poly)acrylates, and (poly)coumarines. With some embodiments, the alignment media of the first and second orientation facilities can each independently include a polyimide, and the orientation facility can be rubbed with a velvet or a cotton cloth so as to at least partially order at least a portion of the surface of the orientation facility.

With some embodiments, the first and second orientation facilities are each independently selected from an ordered polymer sheet, such as a stretched polymer sheet. For example, a sheet of polyvinyl alcohol can be at least partially ordered by stretching (e.g., uniaxially stretching) the sheet, and there-after the stretched sheet can be bonded to or over at least a portion the first surface of the substrate or first polarized layer to form the orientation facility. Alternatively, the ordered polymer sheet can be made by a method that at least partially orders the polymer chains during fabrication, for example, by extrusion. Further, the at least partially ordered polymer sheet can be formed by casting or otherwise forming a sheet of a liquid crystal material and thereafter at least partially ordering the sheet for example, by exposing the sheet to a magnetic field, an electric field, and/or a shear force. Still further, the at least partially ordered polymer sheet can be made using photo-orientation methods. For example, a sheet of a photo-orientation material can be formed, for example by casting, and thereafter at least partially ordered by exposure to linearly polarized ultraviolet radiation.

The first and second orientation facilities can each be independently selected from a treated surface, such as an at least partially treated surface. As used herein, the term "treated surface" refers to at least a portion of a surface that has been physically altered to create at least one ordered region on at least a portion of the surface. Examples of treated surfaces include, but are not limited to, rubbed surfaces, etched surfaces, and embossed surfaces. Further, the treated surfaces can be patterned, for example using a photolithographic or an interferographic process. With some embodiments, the first and second orientation facilities can each independently be a treated surface selected from, for example, chemically etched surfaces, plasma etched surfaces, nanoetched surfaces (such as surfaces etched using a scanning tunneling microscope or an atomic force microscope), laser etched surfaces, and/or electron-beam etched surfaces.

In accordance with some embodiments, the first and second orientation facilities are each independently selected from a treated surface that is formed by depositing a metal salt (such as a metal oxide or metal fluoride) onto at least a portion of a surface (e.g., a surface of the orientation itself, or another surface, such as the first surface of the substrate or a surface of the primer layer), and thereafter etching the deposit to form the treated surface. Art-recognized methods of depositing a metal salt include, but are not limited to, plasma vapor deposition, chemical vapor deposition, and sputtering. Etching can be undertaken in accordance with art-recognized methods, such as those described previously herein.

The first and second orientation facilities can each be independently selected from a Langmuir-Blodgett film. As used herein the term "Langmuir-Blodgett film(s)" means one or more at least partially ordered molecular films on a surface. Langmuir-Blodgett films can be formed, for example, by dipping a substrate into a liquid one or more times so that it is at least partially covered by a molecular film and then removing the substrate from the liquid such that, due to the relative surface tensions of the liquid and the substrate, the molecules of the molecular film are at least partially ordered in substantially one (or a single) general direction. As used herein, the term "molecular film" refers to monomolecular films (which can be referred to herein as monolayers) as well as films comprising more than one monolayer.

The polarizing articles of the present invention include a first polarized layer that resides over the first orientation facility. The first polarized layer includes a first dichroic fixed-tint dye and a first liquid crystal material. The first polarized layer is at least partially aligned with the first orientation direction of the underlying first orientation facility. More particularly, the first dichroic fixed-tint dye and the first liquid crystal material of the first polarized layer are each at least partially aligned with the first orientation direction of the underlying first orientation facility. The first polarized layer has a first polarization axis. The first polarization axis is aligned substantially with the first orientation direction of the first orientation facility, with some embodiments.

The polarizing articles of the present invention further include a second orientation facility that resides over the first polarized layer. The second orientation facility has a second orientation direction. The polarizing articles of the present invention further include a second polarized layer that resides over the second orientation facility. The second polarized layer includes a second dichroic fixed-tint dye and a second liquid crystal material. The second polarized layer is at least partially aligned with the second orientation direction of the underlying second orientation facility. More particularly, the second dichroic fixed-tint dye and the second liquid crystal material of the second polarized layer are each at least partially aligned with the second orientation direction of the underlying second orientation facility. The second polarized layer has a second polarization axis. The second polarization axis is aligned substantially with the second orientation direction of the second orientation facility, with some embodiments.

The first dichroic fixed-tint dye (of the first polarized layer) and the second dichroic fixed-tint dye (of the second polarized layer) are each independently selected from or include, with some embodiments, azomethines, indigoids, thioindigoids, merocyanines, indans, quinophthalonic dyes, perylenes, phthaloperines, triphenodioxazines, indoloquinoxalines, imidazo-triazines, tetrazines, azo dyes, (poly)azo dyes, benzoquinones, naphthoquinones, anthraquinone and (poly)anthraquinones, anthrapyrimidinones, iodine, iodides, and combinations of two or more thereof.

The first dichroic fixed-tint dye, with some embodiments, is present in the first polarized layer in amount of from 0.01 to 99 percent by weight, or from 0.01 to 40 percent by weight, or from 0.05 to 15 percent by weight, or from 0.1 to 5 percent by weight, the percent weights being based in each case on the total weight of the first polarized layer.

The second dichroic fixed-tint dye, with some embodiments, is present in the second polarized layer in amount of from 0.01 to 99 percent by weight. For example, the second dichroic fixed-tint dye can be present in the second polarized layer in amount of from 0.01 to 40 percent by weight. For example, the second dichroic fixed-tint dye can be present in the second polarized layer in amount of from 0.05 to 15 percent by weight. For example, the second dichroic fixed-tint dye can be present in the second polarized layer in amount of from 0.1 to 5 percent by weight. The percent weights being based in each case on the total weight of the second polarized layer.

The first liquid crystal material of the first polarized layer, and the second liquid crystal material of the second polarized layer, with some embodiments, are in each case independently selected from liquid crystal polymers, liquid crystal pre-polymers, liquid crystal monomers, liquid crystal mesogens, and combinations thereof. The first liquid crystal material and the second liquid crystal material can each independently be selected from those classes and examples of liquid crystal materials as described previously herein with regard to the liquid crystal materials of the first and second orientation facilities. The first liquid crystal material and the second liquid crystal material, with some embodiments, can each independently be selected from: crosslinkable liquid crystal monomers, including photo-crosslinkable liquid crystal monomers; and/or crosslinkable liquid crystal polymers and pre-polymers, including photo-crosslinkable liquid crystal polymers and pre-polymers, including those classes and examples of crosslinkable liquid crystal materials as described previously herein with regard to the liquid crystal materials of the first and second orientation facilities.

With some embodiments, the first liquid crystal material (of the first polarized layer) and the second liquid crystal material (of the second polarized layer) are each independently selected from a thermotropic liquid crystal material. The thermotropic liquid crystal materials from which the first and second liquid crystal materials can each be independently selected include, but are not limited to, those thermotropic liquid crystal materials as described previously herein with regard to the liquid crystal materials of the first and second orientation facilities.

The first liquid crystal material is present in the first polarized layer, with some embodiments, in an amount of from 1 percent by weight to 99.9 percent by weight, or from 40 percent by weight to 99 percent by weight, or from 80 percent by weight to 98 percent by weight, or from 90 percent by weight to 95 percent by weight, the percent weights in each case being based on the total weight of first polarized layer.

The second liquid crystal material is present in the second polarized layer, with some embodiments, in an amount of from 1 percent by weight to 99.9 percent by weight, or from 40 percent by weight to 99 percent by weight, or from 80 percent by weight to 98 percent by weight, or from 90 percent by weight to 95 percent by weight, the percent weights in each case being based on the total weight of second polarized layer.

The first and second polarized layers can each be independently formed by art-recognized methods including, but not limited to: lamination, such as of one or more plastic sheets or films; in-mold formation, such as in-mold coating; film casting; and coating methods. With some embodiments the first and second polarized layers are each independently formed from a dichroic fixed-tint dye coating (or polarized layer) composition that includes a first/second dichroic fixed-tint dye and a first/second liquid crystal material, as the case may be. The first and second dichroic fixed-tint dye coating compositions can each independently be applied by art-recognized application methods including, but not limited to, spin coating application methods, dip coating application methods, spray application methods, curtain coating application methods, draw-down application methods (such as using a draw-down bar), and combinations thereof. The first and second dichroic fixed-tint dye coating compositions can each independently be a curable dichroic fixed-tint dye coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; and/or actinic radiation, such as in the case of ultraviolet light curable coating compositions.

The first and second polarized layers each typically and independently include an organic matrix, such as a thermoplastic organic matrix and/or a crosslinked organic matrix, with some embodiments. At least a portion of the organic matrix of the first and second polarized layers includes or is defined by the first/second dichroic fixed-tint dyes and the first/second liquid crystal materials, and optional additives, as described in further detail herein. Additionally or alternatively to an organic matrix, the first and second polarized layers can each independently include an inorganic matrix, including, for example, silane linkages, siloxane linkages and/or titanate linkages. The organic matrix of the first and second polarized layers can each independently include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The first and second polarized layers can each independently have any suitable thickness. With some embodiments, the first and second polarized layers each independently have a thickness of from 0.5 to 50 microns, such as from 1 to 45 microns, or from 2 to 40 microns, or from 5 to 30 microns, or from 10 to 25 microns.

With some embodiments, the first and second polarized layers can each independently include a phase-separated polymer that includes: a matrix phase; and a guest phase distributed in the matrix phase. The matrix phase can independently include an at least partially ordered liquid crystal polymer. The guest phase can independently include an at least partially ordered liquid crystal material (such as a liquid crystal mesogen) and at least a portion of the dichroic fixed-tint dye, which can be at least partially aligned. The at least partially aligned dichroic fixed-tint dye can be at least partially aligned by interaction with the at least partially ordered liquid crystal material of the guest phase.

For purposes of non-limiting illustration, with some embodiments, a phase-separating polymer system including, a matrix phase forming material that includes a liquid crystal material, and a guest phase forming material that includes a liquid crystal material and the dichroic fixed-tint dye, is applied over the previously applied orientation facility (which has an orientation direction). After applying the phase-separating polymer system, at least portion of the liquid crystal material of the matrix phase and at least a portion of the liquid crystal material of the guest phase are at least partially aligned with the orientation direction of the underlying orientation facility, such that at least a portion of the dichroic fixed-tint dye is aligned with at least a portion of the at least partially ordered liquid crystal material of the guest phase.

After ordering the matrix phase forming material and the guest phase forming material, the guest phase forming material can be separated from the matrix phase forming material by polymerization induced phase separation and/or solvent induced phase separation. Although the separation of the matrix and guest phase forming materials is described herein in relation to the guest phase forming material separating from the matrix phase forming material, it should be appreciated that this language is intended to cover any separation between the two phase forming materials. That is, this language is intended to cover separation of the guest phase forming material from the matrix phase forming material, and separation of the matrix phase forming material from the guest phase forming material, as well as, simultaneous separation of both phase forming materials, and any combination thereof.

In accordance with some embodiments, the matrix phase forming material can include a liquid crystal material chosen form those as described previously herein with regard to the first and second orientation facilities, such as liquid crystal monomers, liquid crystal pre-polymers, and liquid crystal polymers. The guest phase forming material can, with some embodiments, include a liquid crystal material chosen form those as described previously herein with regard to the first and second orientation facilities, such as liquid crystal mesogens, liquid crystal monomers, and liquid crystal polymers and pre-polymers.

With some embodiments, the phase-separating polymer system can include, a mixture of a matrix phase forming material that includes a liquid crystal monomer, a guest phase forming material that includes liquid crystal mesogens and the dichroic fixed-tint dye. With such non-limiting embodiments, causing the guest phase forming material to separate from the matrix phase forming material can include polymerization induced phase-separation. Typically, the liquid crystal monomer of the matrix phase can be polymerized and thereby separated from at least a portion of the liquid crystal mesogens of the guest phase forming material. Examples of polymerization methods include, but are not limited to, photo-induced polymerization and thermally-induced polymerization.

With some further embodiments, the phase-separating polymer system can include, a mixture of a matrix phase forming material that includes a liquid crystal monomer, a guest phase forming material that includes a low viscosity liquid crystal monomer having a different functionality from the liquid crystal monomer of the matrix phase, and the dichroic fixed-tint dye. As used herein, the term "low viscosity liquid crystal monomer," refers to a liquid crystal monomer mixture or solution that is freely flowing at room temperature. Typically, causing the guest phase forming material to separate from the matrix phase forming material includes polymerization induced phase-separation. For example, at least a portion of the liquid crystal monomer of the matrix phase can be polymerized under conditions that do not cause the liquid crystal monomer of the guest phase to polymerize. During polymerization of the matrix phase forming material, the guest phase forming material typically separates from the matrix phase forming material. Thereafter, the liquid crystal monomer of the guest phase forming material can be polymerized in a separate polymerization process.

The phase-separating polymer system can include, with some embodiments, a solution in at least one common solvent of a matrix phase forming material that includes a liquid crystal polymer, a guest phase forming material that includes a liquid crystal polymer that is different from the liquid crystal polymer of the matrix phase forming material, and the dichroic fixed-tint dye. Causing the guest phase forming material to separate from the matrix phase forming material typically includes solvent induced phase-separation. Typically, at least a portion of the common solvent is evaporated from the mixture of liquid crystal polymers, thereby causing the two phases to separate from each other.

With further embodiments, the first and second polarized layers can each independently include an interpenetrating polymer network. The at least partially ordered anisotropic material and a polymeric material can form an interpenetrating polymer network, in which at least a portion of the polymeric material interpenetrates with at least a portion of the at least partially ordered liquid crystal material. As used herein the term "interpenetrating polymer network" means an entangled combination of polymers, at least one of which is cross-linked, that are not bonded to each other. Thus, as used herein, the term interpenetrating polymer network includes semi-interpenetrating polymer networks. For example, see L. H. Sperling, *Introduction to Physical Polymer Science*, John Wiley & Sons, New York (1986) at page 46. In addition, at least a portion of the at least partially aligned dichroic fixed-tint dye can be at least partially aligned with the at least partially ordered liquid crystal material. Still further, the polymeric material can be isotropic or anisotropic, provided that, on the whole, the polarized layer is anisotropic.

With some embodiments, the method of the present invention further includes: (i) at least partially setting the first polarized layer, after aligning the first polarized layer at least partially with the first orientation direction of the first orientation facility, and prior to forming the second orientation facility; and (ii) at least partially setting the second polarized layer after aligning the second polarized layer at least partially with the second orientation direction of the second orientation facility.

As used herein, the term "setting" and related terms, such as "set," with regard to the first and second polarized layers, after alignment with the underlying and respective first or second orientation facility, means that the polarized layer is modified so that the polarization axis thereof is substantially fixed. The method of setting the first and second polarized layers can in each case be independently selected from, with some embodiments, curing the polarized layer (such as by thermal and/or actinic radiation curing), solvent removal, temperature reduction (such as with a thermoplastic polarized layer), and combinations thereof.

The first and second polarized layers can each independently further include at least one additive that can, for example, facilitate one or more of the processing, the properties, or the performance of such layer. With some embodiments, the first polarized layer and the second polarized layer each independently further include an additive that is independently selected from fixed-tint dyes, photochromic materials, alignment promoters, horizontal alignment agents, kinetic enhancing additives, photoinitiators, thermal initiators, polymerization inhibitors, solvents, light stabilizers (such as, but not limited to, ultraviolet light absorbers and light stabilizers, such as hindered amine light stabilizers (HALS)), heat stabilizers, mold release agents, rheology control agents, leveling agents (such as, but not limited to, surfactants), free radical scavengers, adhesion promoters (such as hexanediol diacrylate and coupling agents), and combinations of two or more thereof.

Examples of fixed-tint dyes that can be independently present in the first and/or second polarized layers, and optionally one or more other layers of the polarizing articles of the present invention, include, but are not limited to, those examples of fixed-tint dyes as described previously herein with regard to the substrate.

As used herein, the term "alignment promoter" means an additive that can facilitate at least one of the rate and uniformity of the alignment of a material to which it is added. Non-limiting examples of alignment promoters that can be present in the first and/or second polarized layers, and optionally one or more other layers of the polarizing articles of the present invention, include, but are not limited to, those described in U.S. Pat. No. 6,338,808 and U.S. Patent Publication No. 2002/0039627, which are hereby specifically incorporated by reference herein.

Horizontal alignment (or orientation) agents that can be used with some embodiments of the present invention assist in aligning the longitudinal axis of a dichroic fixed-tint dye substantially parallel to a horizontal plane of the polarized layer. Examples of horizontal alignment agents that can be used with some embodiments of the present invention include, but are not limited to, those disclosed at column 13, line 58 through column 23, line 2 of U.S. Pat. No. 7,315,341 B2, which disclosure is incorporated herein by reference.

Non-limiting examples of kinetic enhancing additives that can independently be present in the first and/or second polarized layers, and optionally one or more other layers of the polarizing articles of the present invention, include epoxy-containing compounds, organic polyols, and/or plasticizers. More specific examples of such kinetic enhancing additives are disclosed in U.S. Pat. No. 6,433,043 and U.S. Patent Publication No. 2003/0045612, which are hereby specifically incorporated by reference herein. With some embodiments, a kinetic enhancing additive can be present, in particular, when a photochromic compound is also present.

Non-limiting examples of photoinitiators that can be independently present in the first and/or second polarized layers, and optionally one or more other layers of the polarizing articles of the present invention, include, but are not limited to, cleavage-type photoinitiators and abstraction-type photoinitiators. Non-limiting examples of cleavage-type photoinitiators include acetophenones, α-aminoalkylphenones, benzoin ethers, benzoyl oximes, acylphosphine oxides and bisacylphosphine oxides or mixtures of such initiators. A commercial example of such a photoinitiator is DAROCURE® 4265, which is available from Ciba Chemicals, Inc. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be independently present in first and/or second polarized layer, and optionally one or more other layers of the polarizing articles of the present invention, is a visible light photoinitiator. Non-limiting examples of suitable visible light photoinitiators are disclosed at column 12, line 11 to column 13, line 21 of U.S. Pat. No. 6,602,603, which is specifically incorporated by reference herein.

Examples of thermal initiators that can be independently present in the first and/or second polarized layers, and optionally one or more other layers of the polarizing articles of the present invention, include, but are not limited to, organic peroxy compounds and azobis(organonitrile) compounds. Examples of organic peroxy compounds that are useful as thermal initiators include, but are not limited to, peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauroyl peroxide, propionyl peroxide, acetyl peroxide, benzoyl peroxide and p-chlorobenzoyl peroxide; peroxyesters such as t-butylperoxy pivalate, t-butylperoxy octylate and t-butylperoxyisobutyrate; methylethylketone peroxide, and acetylcyclohexane sulfonyl peroxide. With some non-limiting embodiments, the thermal initiators used are those that do not discolor the resulting polymerizate. Examples of azobis(organonitrile) compounds that can be used as thermal initiators include, but are not limited to, azobis(isobutyronitrile), azobis(2,4-dimethylvaleronitrile) or a mixture thereof.

Examples of solvents that can be present in compositions from which are formed the first and/or second polarized layers, and optionally one or more other layers of the polarizing articles of the present invention, include, but are not limited to, those that can dissolve solid components of the coating, that are compatible with the coating and the elements and substrates, and/or can ensure uniform coverage of the exterior surface(s) to which the coating is applied. Examples of solvents include, but are not limited to, the following: propylene glycol monomethyl ether acetate and their derivates (sold as DOWANOL® industrial solvents), acetone, amyl propionate, anisole, benzene, butyl acetate, cyclohexane, dialkyl ethers of ethylene glycol, e.g., diethylene glycol dimethyl ether and their derivates (sold as CELLOSOLVE® industrial solvents), diethylene glycol dibenzoate, dimethyl sulfoxide, dimethyl formamide, dimethoxybenzene, ethyl acetate, isopropyl alcohol, methyl cyclohexanone, cyclopentanone, methyl ethyl ketone, methyl isobutyl ketone, methyl propionate, propylene carbonate, tetrahydrofuran, toluene, xylene, 2-methoxyethyl ether, 3-propylene glycol methyl ether, and mixtures thereof.

Classes and examples of photochromic compounds and materials that can be independently included in the first and/or second polarized layers, and optionally one or more other layers of the polarizing articles of the present invention, include, but are not limited to, those classes and examples of photochromic compounds as described previously herein with regard to the substrate.

Each additive can be independently present in first and/or second polarized layers, and optionally one or more other layers of the polarizing articles of the present invention, in an effective amount (i.e., and amount that the particular additive is effective for its intended use). With some embodiments, each additive is independently present in the first and/or second polarized layers, and optionally one or more other layers of the polarizing articles of the present invention, in an amount of from 0.001 to 20 percent by weight, or from 0.01 to 10 percent by weight, or from 0.1 to 5 percent by weight, the percent weights in each case being based on the total weight of the particular layer. The solvent(s), with some embodiments, can be independently present in the composition from which each particular layer is formed in an amount of from 0.1 to 80 percent by weight, or from 0.5 to 50 percent by weight, or from 1 to 25 percent by weight, the percent weights being based on the total weight of the composition from which the particular layer is formed.

The polarizing articles of the present invention can, with some embodiments, further include: a first alignment transfer material interposed between the first orientation facility and the first polarized layer; and/or a second alignment transfer material interposed between the second orientation facility and the second polarized layer. The alignment transfer material, in each case, can be aligned by interaction with the underlying orientation facility, and correspondingly the dichroic fixed-tint dye and the liquid crystal material of the overlying polarized layer can be aligned by interaction with the underlying alignment transfer material. The alignment transfer material can, with some embodiments, facilitate the propagation or transfer of a suitable arrangement or position from the underlying orientation facility to the dichroic fixed-tint dye and liquid crystal material of the overlying polarized layer.

Examples of alignment transfer materials include, but are not limited to, those liquid crystal materials described above in connection with the alignment media of the first and second orientation facilities. Additionally, although not required, according to various non-limiting embodiments disclosed herein, at least a portion of the liquid crystal material of the alignment transfer material can be exposed to at least one of, a magnetic field, an electric field, linearly polarized infrared radiation, linearly polarized ultraviolet radiation, and linearly polarized visible radiation, while being at least partially aligned with at least a portion of the underlying orientation facility.

With the polarizing articles and method of the present invention, the first polarization axis of the first polarized layer and the second polarization axis of the second polarized layer are oriented relative to each other at an angle of greater than 0° and less than or equal to 90°, such as: (i) at least 0.1°, or at least 0.5°, or at least 1°, or at least 5°, or at least 10°, or at least 15°, or at least 20°, or at least 25°, or at least 30°; and (ii) less than or equal to 90°, or less than or equal to 85°, or less than or equal to 80°, or less than or equal to 75°, or less than or equal to 70°, or less than or equal to 65°, or less than or equal to 60°, or less than or equal to 55°, or less than or equal to 50°. The first polarization axis of the first polarized layer and the second polarization axis of the second polarized layer can be oriented relative to each other at an angle that ranges between any combination of these lower (i) and upper (ii) values, inclusive of the recited values, such as: (a) from 0.1° to 90°, or from 1° to 90°, or from 10° to 90°, or from 25° to 90°, or from 30° to 90°, or from 45° to 90°, or from 60° to 90°, inclusive of the recited values; or (b) from 0.5° to 85°, or from 10° to 80°, or from 15° to 75°, or from 20° to 70°, or from 25° to 65°, or from 30° to 50°, inclusive of the recited values. With some embodiments, when the first and second polarization axes are oriented relative to each other at an angle of 90°, the polarizing articles of the present invention have a minimum level of transmittance of incident actinic radiation.

With the polarizing articles and method of the present invention, the first polarization axis of the first polarized layer is aligned substantially with (and is substantially parallel with) the first orientation direction of the first orientation facility, and the second polarization axis of the second polarized layer is aligned substantially with (and is substantially parallel with) the second orientation direction of the second orientation facility. Correspondingly, and with some embodiments, the first orientation direction of the first orientation facility and the second orientation direction of the second orientation facility are oriented relative to each other at an angle of greater than 0° and less than or equal to 90°, such as: (i) at least 0.1°, or at least 0.5°, or at least 1°, or at least 5°, or at least 10°, or at least 15°, or at least 20°, or at least 25°, or at least 30°; and (ii) less than or equal to 90°, or less than or equal to 85°, or less than or equal to 80°, or less than or equal to 75°, or less than or equal to 70°, or less than or equal to 65°, or less than or equal to 60°, or less than or equal to 55°, or less than or equal to 50°. The first orientation direction of the first orientation facility and the second orientation direction of the second orientation facility can be oriented relative to each other at an angle that ranges between any combination of these lower (i) and upper (ii) values, inclusive of the recited values, such as: (a) from 0.1° to 90°, or from 1° to 90°, or from 10° to 90°, or from 25° to 90°, or from 30° to 90°, or from 45° to 90°, or from 60° to 90°, inclusive of the recited values; or (b) from 0.5° to 85°, or from 10° to 80°, or from 15° to 75°, or from 20° to 70°, or from 25° to 65°, or from 30° to 50°, inclusive of the recited values.

The polarizing articles with some embodiments of the present invention are linear polarizing articles, and the first polarized layer is a first linear polarized layer, the first polarization axis is a first linear polarization axis, the second polarized layer is a second linear polarized layer, and the second polarization axis is a second linear polarization axis.

With some embodiments, the first and second polarized layers each independently have an absorption ratio of at least 1.5. With some further embodiments, the first and second polarized layers each independently have an absorption ratio ranging from at least 1.5 to 50 (or greater), such as from 2.5 to 50, or from 3 to 30, or from 4 to 20, inclusive of the recited values. The term "absorption ratio" refers to the ratio of the absorbance of radiation linearly polarized in a first plane to the absorbance of radiation linearly polarized in a plane orthogonal to the first plane, in which the first plane is taken as the plane with the highest absorbance. Thus, the absorption ratio is an indication of how strongly one of two orthogonal plane polarized components of radiation is absorbed by an object or material. The absorption ratio can be determined in accordance with art-recognized methods.

The first dichroic fixed-tint dye (of the first polarized layer) has a first electromagnetic absorption spectrum, the second dichroic fixed-tint dye (of the second polarized layer) has a second electromagnetic absorption spectrum, and the first electromagnetic absorption spectrum and the second electromagnetic absorption spectrum are different from each other, with the polarizing articles of the present invention. The first and second electromagnetic absorption spectra can each be independently selected from, with some embodiments: (i) non-visible electromagnetic absorption spectra, such as ultraviolet electromagnetic absorption spectra and infrared electromagnetic absorption spectra; (ii) visible electromagnetic absorption spectra, such as various electromagnetic absorption spectra residing within wavelengths of from 400 nm to 700 nm; and (iii) combinations of (i) and (ii).

With some embodiments of the present invention: the first electromagnetic absorption spectrum (of the first dichroic fixed-tint dye) includes a first visible light absorption spectrum; the second electromagnetic absorption spectrum (of the second dichroic fixed-tint dye) includes a second visible light absorption spectrum; and the first visible light absorption spectrum (of the first dichroic fixed-tint dye) and the second visible light absorption spectrum (of the second dichroic fixed-tint dye) are different from each other.

With some further embodiments of the present invention: the first electromagnetic absorption spectrum (of the first dichroic fixed-tint dye) includes a first visible light absorption spectrum, which corresponds to a first transmitted visible color; the second electromagnetic absorption spectrum (of the second dichroic fixed-tint dye) includes a second visible light absorption spectrum, which corresponds to as a second transmitted visible color; and correspondingly, the first transmitted visible color of the first polarized layer and the second transmitted visible color of the second polarized layer, are different from each other. With some additional embodiments, the first transmitted visible color of the first polarized layer and the second transmitted visible color of the second polarized layer are each independently selected from red, orange, yellow, green, blue, indigo, violet, and combinations thereof, provided that the first transmitted visible color (of the first polarized layer) and the second transmitted visible color (of the second polarized layer) are different from each other.

In accordance with some non-limiting embodiments of the present invention, and for purposes of non-limiting illustration, the first transmitted visible color of the first polarized layer and the second transmitted visible color of the second polarized layer are selected and paired as summarized in the following Table (A):

TABLE (A)

| First transmitted visible color of the first polarized layer | Second transmitted visible color of the second polarized layer |
| --- | --- |
| Red | Green |
| Green | Red |
| Red | Blue |
| Blue | Red |
| Pink | Orange |
| Orange | Pink |
| Blue | Yellow |
| Yellow | Blue |

The combination of: (i) the first polarization axis and the second polarization axis being oriented relative to each other at an angle of greater than 0° and less than or equal to 90°; and (ii) the first visible light absorption spectrum (and corresponding first transmitted visible color) and the second visible light absorption spectrum (and corresponding second transmitted visible color) being different from each other, allows the polarizing articles with some embodiments of the present invention to selectively extract one or more colors from the polarized light that passes through the polarizing articles, which can provide enhanced contrast of the electromagnetic spectrum (such as visible color(s)) that is transmitted through the polarizing articles.

With some embodiments, the polarizing articles of the present invention can include one or more further layers, such as, but not limited to, a topcoat layer, a hardcoat layer, a primer layer, a birefringent layer, and one or more anti-reflective layers.

The polarizing articles of the present invention, with some embodiments, further include a topcoat layer that resides over the second polarized layer, in which the topcoat layer includes an ultraviolet light absorber.

Figure 2:
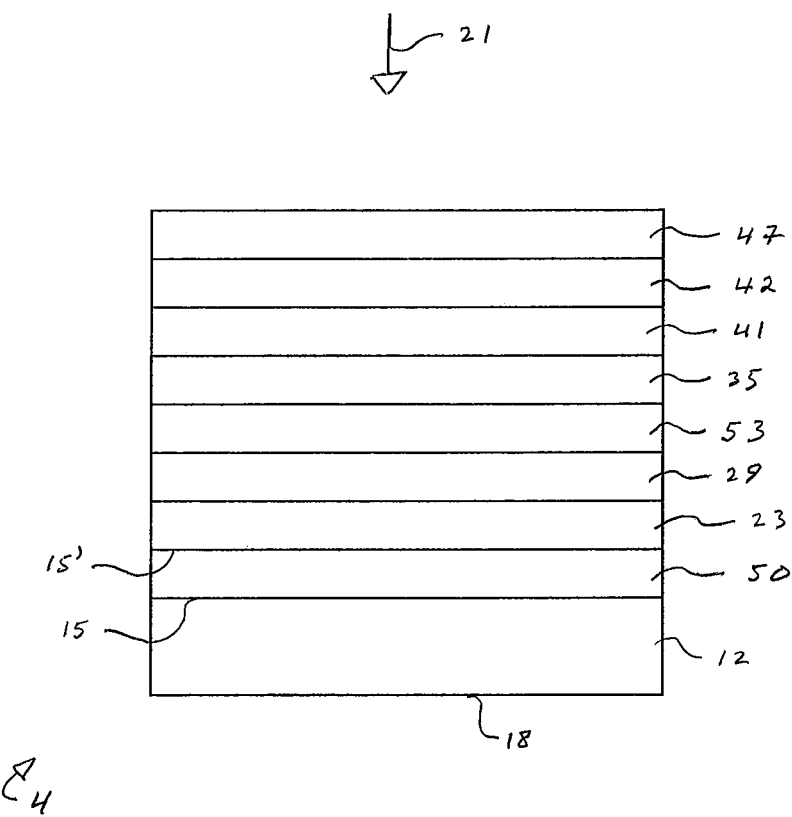
FIG. 2 is a representative side elevational sectional view of a polarizing article according to the present invention, that further includes a primer layer, a birefringent layer, a topcoat layer, and a hardcoat layer.

With reference to FIG. 2, polarizing article 4 includes a topcoat layer 42 the resides over the second polarized layer 41, and the second polarized layer 41 is interposed between the second orientation facility 35 and the topcoat layer 42.

The topcoat layer can include a single layer or multiple layers (which can be the same or different) at least one of which includes an ultraviolet light absorber. The topcoat layer typically includes an organic matrix, such as a thermoplastic organic matrix and/or a crosslinked organic matrix. Additionally or alternatively to an organic matrix, the topcoat layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The topcoat layer can be formed by art-recognized methods including, but not limited to: lamination, such as of one or more plastic sheets or films; in-mold formation, such as in-mold coating; film casting; and coating methods. Typically, the topcoat layer is formed from a topcoat coating composition. The topcoat coating composition can be a curable topcoat coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The topcoat layer can have any suitable thickness. With some embodiments, the topcoat layer has a thickness of from 0.5 microns to 10 microns, such as from 1 to 8 microns, or from 2 to 5 microns, inclusive of the recited values.

With some embodiments, the topcoat layer includes an organic matrix formed from a radiation-cured acrylate-based composition, and correspondingly, the topcoat layer can be described as an acrylate-based topcoat layer.

The acrylate-based topcoat layer can be prepared using (meth)acrylate monomers and/or (meth)acrylic acid monomers. The (meth)acrylate monomers can include one, two, three, four, or five (meth)acrylate groups. Additional co-polymerizable monomers, such as epoxy monomers (e.g., monomers containing a epoxy (or oxirane) functionality) monomers containing both (meth)acrylate and epoxy functionalities, etc., can also be present in the formulation used to prepare the (meth)acrylate-based topcoat layer. The monomers used to prepare the (meth)acrylate-based topcoat layer include a plurality (e.g., a major amount, i.e., more than 50 weight percent) of (meth)acrylate monomers; hence the designation "(meth)acrylate-based topcoat layer." The formulations used to prepare the (meth)acrylate-based topcoat layer can also contain components having at least one isocyanate (—NCO) group (e.g., organic monoisocyanates, organic diisocyanates, and organic triisocyanates) whereby urethane linkages can be incorporated into the topcoat layer.

The (meth)acrylate-based topcoat layer typically possesses physical properties including, for example, transparency, adherence to the underlying second polarized layer, resistance to removal by aqueous alkali metal hydroxide, compatibility with an optional abrasion-resistant coating, such as a hardcoat layer, applied to its surface, and scratch resistance. With some embodiments, the (meth)acrylate-based topcoat layer has a hardness that is greater than that of the underlying second polarized layer.

Radiation curing of (meth)acrylate-based polymeric systems can be achieved with, for example, electron beam curing (EB) and/or ultraviolet light (UV) radiation. Ultraviolet curing typically requires the presence of at least one photoinitiator, whereas curing by EB techniques does not require a photoinitiator. With the exception of the presence or absence of the photoinitiator, the (meth)acrylate-based formulations, which are cured by either UV or EB radiation technology, can otherwise be identical.

In accordance with some embodiments, the (meth)acrylate-based topcoat layer is formed from a composition that includes a combination or miscible blend of one or more free-radical initiated (meth)acrylate monomers and/or (meth)acrylate oligomers, and one or more cationic initiated epoxy monomers. When this blend of monomers is cured, a (meth)acrylate-based topcoat layer, in the form of a polymerizate, is formed and optionally includes an interpenetrating network of polymer components.

Examples of (meth)acrylate monomers that can be included in compositions from which the (meth)acrylate-based topcoat layer can be formed, include, but are not limited to, polyfunctional (meth)acrylates having, for example, 1, 2, 3, 4, or 5 (meth)acrylate groups, and monofunctional (meth)acrylates (e.g., a monomer containing a single (meth)acrylate group) hydroxy-substituted (meth) acrylates and alkoxysilyl alkylacrylates, such as trialkoxysilylpropylmethacrylate. Other reactive monomers/diluents, such as monomers containing an ethylenic functional group (other than the (meth)acrylate monomers) can also be present.

Compositions from which the (meth)acrylate-based topcoat layer can be formed, and methods of applying and curing such compositions, are disclosed at column 16, line 14 through column 25, line 3 of U.S. Pat. No. 7,452,611 B2, which disclosure is incorporated herein by reference.

Compositions from which the topcoat layer is formed can include one or more additives, including, but not limited to, adhesion promoters, coupling agents, ultraviolet light absorbers, thermal stabilizers, catalysts, free radical scavengers, plasticizers, flow additives, and/or fixed-tint dyes.

With some embodiments, the compositions from which the (meth)acrylate-based topcoat layer can be formed, can further include an adhesion promoter. The adhesion promoter can be selected from, for example, organo-silanes, such as aminoorganosilanes, organic titanate coupling agents, organic zirconate coupling agents, and combinations thereof. Examples of adhesion promoters, which can be included in the compositions from which the acrylate-based topcoat layer can be formed, include, but are not limited to, those disclosed at column 5, line 52 through column 8, line 19 of U.S. Pat. No. 7,410,691 B2, which disclosure is incorporated herein by reference.

The topcoat layer includes an ultraviolet light absorber. The ultraviolet light absorber can be selected from one or more art-recognized classes of ultraviolet light absorbers, including, but not limited to: hindered amines, which can include, for example, one or more 2,2,6,6-tetramethyl N-substituted piperidine groups; benzophenones; and/or benzotriazoles. The ultraviolet light absorber is typically present in at least an effective amount, such as from 0.1 to 10 percent by weight, or 0.2 to 5 percent by weight, or from 0.3 to 3 percent by weight, based on the total solids weight of the coating composition from which the topcoat layer is prepared.

With some embodiments of the present invention, the topcoat layer is free of and does not include a dichroic fixed-tint dye.

The polarizing articles of the present invention further include, with some embodiments, a hardcoat layer that resides over the topcoat layer. With reference to FIG. 2, polarizing article 4 includes a hardcoat layer 47 over the topcoat layer 42. The topcoat layer 42 is interposed between the underlying second polarized layer 41 and the overlying hardcoat layer 47. The hardcoat layer can include a single layer or multiple layers, which can be the same or different.

The hardcoat layer can be selected from abrasion-resistant coatings including organo-silanes, abrasion-resistant coatings including radiation-cured acrylate-based thin films, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. With some embodiments, the hardcoat layer can include a first coating of a radiation-cured acrylate-based thin film and a second coating including an organo-silane. Non-limiting examples of commercial hard-coating products include SILVUE® 124 and HI-GARD® coatings, available from SDC Coatings, Inc. and PPG Industries, Inc., respectively.

The hardcoat layer can be selected from art-recognized hardcoat materials, such as organo-silane abrasion-resistant coatings. Organo-silane abrasion-resistant coatings, often referred to as hardcoats or silicone-based hardcoatings, are well known in the art, and are commercially available from various manufacturers, such as SDC Coatings, Inc. and PPG Industries, Inc. Reference is made to U.S. Pat. No. 4,756,973 at column 5, lines 1-45; and to U.S. Pat. No. 5,462,806 at column 1, lines 58 through column 2, line 8, and column 3, line 52 through column 5, line 50, which disclosures describe organo-silane hardcoatings and which disclosures are incorporated herein by reference. Reference is also made to U.S. Pat. Nos. 4,731,264, 5,134,191, 5,231,156 and International Patent Publication WO 94/20581 for disclosures of organo-silane hardcoatings, which disclosures are also incorporated herein by reference. The hardcoat layer can be applied by art-recognized methods, such as spin coating.

Other coatings that can be used to form the hardcoat layer, include, but are not limited to, polyfunctional acrylic hardcoatings, melamine-based hardcoatings, urethane-based hardcoatings, alkyd-based coatings, silica sol-based hard coatings or other organic or inorganic/organic hybrid hardcoatings.

The hardcoat layer, with some embodiments, is selected from organo-silane type hardcoatings. Organo-silane type hard coatings from which the hardcoat layer of the polarizing articles of the present invention can be selected include, but are not limited to, those disclosed at column 24, line 46 through column 28, line 11 of U.S. Pat. No. 7,465,414 B2, which disclosure is incorporated herein by reference.

In accordance with some embodiments of the present invention, the hardcoat layer is free of and does not include a dichroic fixed-tint dye.

The polarizing articles of the present invention, with some embodiments, include a primer layer that resides over the first surface of the substrate, such that the primer layer is interposed between the first surface of the substrate and the first orientation facility. With some embodiments, the first surface of the substrate is defined by the primer layer.

With reference to FIG. 2, polarizing article 4 includes a primer layer 50 that resides over first surface 15 of substrate 12. Primer layer 50 is interposed between first surface 15 of substrate 12 and the first orientation facility 23. With some embodiments, the upper surface 15' of primer layer 50 defines the first surface of substrate 12.

The primer layer can include a single layer or multiple layers that can be the same or different. The primer layer typically includes an organic matrix, such as a thermoplastic organic matrix and/or a crosslinked organic matrix. Additionally or alternatively to an organic matrix, the primer layer can include an inorganic matrix, including, for example, silane linkages, siloxane linkages and/or titanate linkages. The organic matrix can include, for example: acrylate residues (or monomer units) and/or methacrylate residues; vinyl residues; ether linkages; sulfide linkages, including monosulfide linkages and/or polysulfide linkages; carboxylic ester linkages; carbonate linkages (e.g., —O—C(O)—O—) urethane linkages (e.g., —N(H)—C(O)—O—); and/or thiourethane linkages (e.g., —N(H)—C(O)—S—).

The primer layer can be formed by art-recognized methods including, but not limited to: lamination, such as of one or more plastic sheets or films; in-mold formation, such as in-mold coating; film casting; and coating methods. Typically, the primer layer is formed from a primer coating composition. The primer coating composition can be a curable primer coating composition, that is curable by exposure to, for example: ambient temperatures, such as in the case of two component coating compositions; elevated temperatures (e.g., 150° C. to 190° C. for 5 to 60 minutes), such as in the case of thermally cured coating compositions; or actinic radiation, such as in the case of ultraviolet light curable coating compositions.

The primer layer can have any suitable thickness. With some embodiments, the primer has a thickness of from 0.5 microns to 20 microns, such as from 1 to 10 microns, or from 2 to 8 microns, or from 3 to 5 microns, inclusive of the recited values.

With some embodiments, the primer layer includes an organic matrix that includes urethane linkages. In accordance with some embodiments, the primer layer containing urethane linkages is formed from a curable coating composition that includes: a (meth)acrylate copolymer having active hydrogen functionality selected from hydroxyl, thiol, primary amine, secondary amine, and combinations thereof; blocked isocyanate, such as diisocyanate and/or triisocyanate blocked with a suitable blocking or leaving group, such as, 3,5-dimethyl pyrazole; and one or more additives, including, but not limited to, adhesion promoters, coupling agents, ultraviolet light absorbers, thermal stabilizers, catalysts, free radical scavengers, plasticizers, flow additives, and/or fixed-tint dyes.

Examples of (meth)acrylate monomers from which the active hydrogen functional (meth)acrylate copolymer can be prepared include, but are not limited to, $C_1$-$C_{20}$ (meth)acrylates, $C_1$-$C_{20}$ (meth)acrylates having at least one active hydrogen group selected from hydroxyl, thiol, primary amine, and secondary amine. The $C_1$-$C_{20}$ groups of the (meth)acrylates can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Additional polyols that can be used in the primer coating compositions from which the primer layer is prepared include, but are not limited to, art-recognized materials, such as described in U.S. Pat. No. 7,465,414 at column 15, line 22 through column 16, line 62, which disclosure is incorporated herein by reference. Isocyanates that can be used in the primer coating compositions from which the primer layer is prepared include, but are not limited to, art-recognized materials, such as described in U.S. Pat. No. 7,465,414 at column 16, line 63 through column 17, line 38, which disclosure is incorporated herein by reference. Catalysts that can be used in the primer coating compositions from which the primer layer is prepared include, but are not limited to, art-recognized materials, such as described in U.S. Pat. No. 7,465,414 at column 17, lines 39-62, which disclosure is incorporated herein by reference.

The primer layer can include one or more additives. Such additives can include, but are not limited to, ultraviolet light absorbers, stabilizers, such as hindered amine light stabilizers (HALS), antioxidants (e.g., polyphenolic antioxidants), asymmetric diaryloxalamide (oxanilide) compounds, singlet oxygen quenchers (e.g., a nickel ion complex with an organic ligand) and mixtures and/or combinations thereof.

The primer layer can be applied over the substrate by art-recognized methods including, but not limited to, spray application, spin coating, doctor (or draw-down) blade application, and curtain application.

The primer layer can include at least partial hydrolysates of coupling agents, and mixtures thereof. As used herein "coupling agent" means a material having at least one group capable of reacting, binding and/or associating with a group on at least one surface. With some embodiments, a coupling agent can serve as a molecular bridge at the interface of at least two surfaces that can be similar or dissimilar surfaces. Coupling agents, with further embodiments, can be monomers, oligomers, pre-polymers and/or polymers. Such materials include, but are not limited to, organo-metallics such as silanes, titanates, zirconates, aluminates, zirconium aluminates, hydrolysates thereof and mixtures thereof. As used herein the phrase "at least partial hydrolysates of coupling agents" means that at least some to all of the hydrolyzable groups on the coupling agent are hydrolyzed.

In addition or alternatively to coupling agents and/or hydrolysates of coupling agents, the primer layer can include other adhesion enhancing ingredients. For example, although not limiting herein, the primer layer can further include an adhesion-enhancing amount of an epoxy-containing material. Adhesion-enhancing amounts of an epoxy-containing materials when included in the primer layer, can improve the adhesion of a subsequently applied coating or layer. A class of epoxy (or oxirane) functional adhesion promoters that can be included in compositions from which the primer layer is formed include, but are not limited to, oxirane-functional-alkyl-trialkoxysilanes, such as gamma-glycidoxypropyltrimethoxysilane, and beta-(3,4-epoxycyclohexyl)ethyltrimethoxysilane.

The primer layer, with some embodiments of the present invention, is free of and does not include a dichroic fixed-tint dye.

The polarizing articles of the present invention can, with some embodiments, include additional coatings or layers, such as antireflective coatings or layers. With some embodiments, an antireflective coating can be applied over the hard coat layer. Examples of antireflective coatings are described in U.S. Pat. No. 6,175,450 and International Patent Publication WO 00/33111, the disclosures of which are incorporated herein by reference. With some embodiments, the antireflective coatings or layers are each free of and do not include a dichroic fixed-tint dye.

The polarizing articles of the present invention further include, with some embodiments, a birefringent layer that resides over the first polarized layer, such that the birefringent layer is interposed between the first polarized layer and the second orientation facility. With reference to FIG. 2, polarizing article 2 includes a birefringent layer 53 that resides over the first polarized layer 29, and the birefringent layer 53 is interposed between the underlying first polarized layer 29 and the overlying second orientation facility 35.

The birefringent layer can also be referred to herein as a compensation layer or a retardation layer. The birefringent layer can be composed of a single layer or multiple layers. When the birefringent layer is composed of multiple layers, each layer can be the same, or at least two layers of the multiple layers can be different. The birefringent layer can be formed from one or more polymeric sheets, one or more coating compositions, and combinations thereof.

With some embodiments, the birefringent layer is included for purposes of providing the polarizing articles of the present invention with color enhancing properties and/or spectral filtering properties. In accordance with some embodiments, the properties of the birefringent layer, such as the degree of color enhancement, spectral filtering, circular polarization, and/or elliptical polarization provided thereby, can be selected by modifying one or more of the thickness, refractive index, and level of anisotropic order of the birefringent layer. The level of anisotropic order of the birefringent layer can, with some embodiments, be adjusted by unilateral stretching of the birefringent layer and/or anisotropically ordering one or more liquid crystal materials within the birefringent layer, in accordance with art-recognized methods.

In accordance with some embodiments of the present invention, the birefringent layer is operable to circularly polarize transmitted radiation or elliptically polarize transmitted radiation. As used herein, and with some embodiments, the term "transmitted radiation" with regard to the birefringent layer means the radiation that is transmitted through the birefringent layer. With some embodiments, the birefringent layer includes a quarter-wave plate or layer. In accordance with some further embodiments, the birefringent layer defines a quarter-wave plate.

The birefringent layer, with some embodiments, includes a first ordered region having a first general direction, and at least one second ordered region adjacent the first ordered region having a second general direction that is the same or different from the first general direction so as to form a desired pattern in the birefringent layer. Desired patterns include, but are not limited to, indicia, such as alphanumerics, and designs.

Materials from which the birefringent layer can be prepared, with some embodiments, include birefringent materials that are known in the art. For example, a polymer film, a liquid crystal film, self-assembling materials, or a film in which a liquid crystal material is aligned can be used as or to form the birefringent layer. Examples of birefringent layers include, but are not limited to, those described in U.S. Pat. No. 6,864,932 at column 3, line 60 to column 4, line 64; U.S. Pat. No. 5,550,661 at column 4, line 30 to column 7, line 2; U.S. Pat. No. 5,948,487 at column 7, line 1 to column 10, line 10, the cited disclosures of which, in each case, is incorporated herein by reference.

With some embodiments, the birefringent layer includes a polymeric coating (or is formed from polymeric coating composition). With some further embodiments, the polymer coating (or polymer coating composition) can include self-assembling materials and/or film-forming materials.

Examples of commercially available birefringent films or sheets from which the birefringent layer can be formed include: film Model No. NRF-140, a positively birefringent, uniaxial film available from Nitto Corporation, Japan, or Nitto Denko America, Inc., New Brunswick, N.J.; and OPTIGRAFIX circular polarizer films; available from GRAFIX Plastics, a division of GRAFIX, Inc., Cleveland, Ohio.

The birefringent layer includes one or more polymers. Examples of polymers that can be included in the birefringent layer, and/or from which the birefringent layer can be prepared, include, but are not limited to, polyacrylates, polymethacrylates, poly($C_1$-$C_{12}$) alkyl methacrylates, polyoxy(alkylene methacrylates), poly (alkoxylated phenol methacrylates), cellulose acetate, cellulose triacetate, cellulose acetate propionate, cellulose acetate butyrate, poly (vinyl acetate), poly(vinyl alcohol), poly(vinyl chloride), poly(vinylidene chloride), poly(vinylpyrrolidone), poly ((meth)acrylamide), poly(dimethyl acrylamide), poly(hydroxyethyl methacrylate), poly((meth)acrylic acid), thermoplastic polycarbonates, polyesters, polyurethanes, polythiourethanes, poly(ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate)monomers, mono-functional acrylate monomers, mono-functional methacrylate monomers, polyfunctional acrylate monomers, polyfunctional methacrylate monomers, diethylene glycol dimethacrylate monomers, diisopropenyl benzene monomers, alkoxylated polyhydric alcohol monomers and diallylidene pentaerythritol monomers; and in particular self-assembling materials, polycarbonate, polyamide, polyimide, poly(meth)acrylate, polycyclic alkene, polyurethane, poly(urea)urethane, polythiourethane, polythio(urea)urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly (vinylformal), poly(vinylacetal), poly(vinylidene chloride), poly(ethylene terephthalate), polyester, polysulfone, polyolefin, copolymers thereof, and/or mixtures thereof. With some embodiments, the birefringent layer is formed from one or more polymer sheets that each include one or more polymers, such as, but not limited to, those examples recited with regard to the polymer that can be included in the birefringent layer, and/or from which the birefringent layer can be prepared.

In accordance with some embodiments, the birefringent layer includes a polymeric sheet that includes one or more of, self-assembling materials, polycarbonate, polyamide, polyimide, poly(meth)acrylate, polycyclic alkene, polyurethane, poly(urea)urethane, polythiourethane, polythio(urea) urethane, polyol(allyl carbonate), cellulose acetate, cellulose diacetate, cellulose triacetate, cellulose acetate propionate, cellulose acetate butyrate, polyalkene, polyalkylene-vinyl acetate, poly(vinylacetate), poly(vinyl alcohol), poly(vinyl chloride), poly(vinylformal), poly(vinylacetal), poly(vinylidene chloride), poly(ethylene terephthalate), polyester, polysulfone, polyolefin, copolymers thereof, and/or mixtures thereof.

The birefringent layer can, with some embodiments, be positioned in such a way that a slow axis direction (direction where a refractive index is largest in a plane) of the birefringent layer is oriented with respect to an alignment direction of the first and/or second polarized layers so as to yield the desired resultant polarization, such as circular polarization or elliptical polarization. For example, a quarter-wave plate, with some embodiments, would be oriented at an angle of 45°+/−5° or 45°+/−3° with respect to an alignment direction of the first and/or second dichroic fixed-tint dye of the corresponding first and/or second polarized layer.

With some embodiments, the birefringent layer is free of and does not include a dichroic fixed-tint dye.

In accordance with further embodiments, the polarizing articles of the present invention can be selected from ophthalmic articles or elements, display articles or elements, windows, mirrors, optical filters, active liquid crystal cell articles or elements, and passive liquid crystal cell articles or elements.

Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intraocular lenses, magnifying lenses, protective lenses, and visors, such as protective visors.

Examples of display articles, elements and devices include, but are not limited to, screens, monitors, and security elements, including without limitation, security marks and authentication marks.

Examples of windows include, but are not limited to, automotive, rail, nautical, and aircraft transparencies, filters, shutters, and optical switches.

Examples of optical filters include, but are not limited to, photographic optical filters, optical filters used with video recording devices, telescope optical filters (such as used in astronomy), binocular optical filters, microscope optical filters, and optical filters used with optical instruments (such as spectroscopic instruments).

With some embodiments, the polarizing article can be a security element. Examples of security elements include, but are not limited to, security marks and authentication marks that are connected to at least a portion of a substrate, such as: access cards and passes (e.g., tickets, badges, identification or membership cards, debit cards, etc.); negotiable instruments and non-negotiable instruments (e.g., drafts, checks, bonds, notes, certificates of deposit, stock certificates, etc.); government documents (e.g., currency, licenses, identification cards, benefit cards, visas, passports, official certificates, deeds etc.); consumer goods (e.g., software, compact discs ("CDs"), digital-video discs ("DVDs"), appliances, consumer electronics, sporting goods, cars, etc.); credit cards; and merchandise tags, labels and packaging.

With further embodiments, the security element can be connected to at least a portion of a substrate chosen from a transparent substrate and a reflective substrate. Alternatively, according to further embodiments in which a reflective substrate is required, if the substrate is not reflective or sufficiently reflective for the intended application, a reflective material can be first applied to at least a portion of the substrate before the security mark is applied thereto. For example, a reflective aluminum coating can be applied to the at least a portion of the substrate prior to forming the security element thereon. Additionally or alternatively, the security element can be connected to at least a portion of a substrate chosen from untinted substrates, tinted substrates, photochromic substrates, tinted-photochromic substrates, linearly polarizing, circularly polarizing substrates, and elliptically polarizing substrates.

Security elements according to the aforementioned embodiments can further include one or more other coatings or films or sheets to form a multi-layer reflective security element with viewing angle dependent characteristics, such as described in U.S. Pat. No. 6,641,874.

The present invention is more particularly described in the following examples, which are intended to be illustrative only, since numerous modifications and variations therein will be apparent to those skilled in the art. Unless otherwise specified, all parts and all percentages are by weight.

EXAMPLES

The examples as follows are provided in three parts, Parts 1, 2, and 3. In Part 1 there is provided a description of the preparation of the coating formulations used in the preparation of polarized lenses. In Part 2 there is provided a description of the methods used in the preparation of lenses according to the present invention and comparative lenses. In Part 3 there is provided a description of the performance characteristics of the lenses according to the present invention and the comparative lenses.

Part 1—Preparation of Coating Formulations.

Liquid Crystal Alignment Formulation (LCAE):

A solution of a photoalignment material of the type described in Example 1 of U.S. Pat. No. 9,475,901, the synthesis of which is incorporated herein by reference, was prepared by adding 6 weight percent of the photoalignment material (poly[((E)-2-methoxy-4-(3-methoxy-3-oxoprop-1-enyl)phenyl 4-(6-(methacryloyloxy)hexyloxy)benzoate)-co-(2-[3,5-dimethylpyrazolyl]carboxyamino]ethyl methacrylate)]) to cyclopentanone, based on the total weight of the solution.

Liquid Crystal Coating Formulation (LCF):

A solution of liquid crystal monomers was first prepared as follows. To a suitable flask containing a mixture of anisole (200 g) and BYK®-UV3530 additive 0.5 g (available from BYK Chemie, USA), was added RM257 (150 g, 4-(3-acryloyloxypropyloxy)-benzoic acid 2-methyl-1,4-phenylene ester, available from EMD Chemicals, Inc.), RM105 (150 g, 4-methoxyphenyl 4-((6-(acryloyloxy)hexyl)oxy) benzoate, available from EMD Chemicals, Inc.) and IRGACURE® 819 (4.5 g, a photoinitiator available from Ciba-Geigy Corporation). The resulting solution was stirred for 2 hours at 80° C. and then cooled to about 25° C. This liquid crystal solution was used to prepare the red and green dye solutions described below.

Dichroic fixed-tint dyes were added to the liquid crystal solutions described above as summarized in Table 1, to yield red and green formulations. For each solution described in Table 1, the dyes were added to the liquid crystal solution, then stirred for two hours at 80° C., followed by cooling to approximately 25° C. Magnesium sulfate was added, followed by stirring for two hours at room temperature. The mixture was then centrifuged and the clear portion was collected and used for coating.

TABLE 1

|  | LCF-Red | LCF-Green |
|---|---|---|
| Liquid crystal solution | 20.2 | 20.2 |
| Red-yellow Dye 1[1] | 0.0672 | 0.0405 |
| Red Dye 2[2] | 0.1416 | — |
| Blue-green Dye 3[3] | 0.0312 | 0.2835 |
| Magnesium sulfate | 2.0 | 2.0 |

[1] 1-(4-((4-(heptyloxy)benzyl)oxy)phenyl)-2-(4-((4-pentylphenyl)diazenyl)naphthalen-1-yl)diazene.
[2] 4-((4-((4'-butyl-[1,1'-biphenyl]-4-yl)diazenyl)naphthalen-1-yl)diazenyl)-N,N-diethylaniline.
[3] 4-(trans-4-pentylcyclohexyl)phenyl 1-amino-4-((4-butylphenyl)amino)-9,10-dioxo-9,10-dihydroanthracene-2-carboxylate.

Protective Layer Formulation (PTLF):

The ingredients in the following Table 2 were added to a 500 mL amber glass bottle equipped with a magnetic stir-bar. The solution was stirred for two hours at room temperature before use.

TABLE 2

|  | Weight (g) |
|---|---|
| Hydroxyethyl methacrylate | 12.42 |
| Neopentyl glycol diacrylate | 137.2 |
| Trimethylolpropane trimethacrylate | 25.8 |
| DESMODUR ® PL 340[4] | 50.2 |
| IRGACURE ®-819[5] | 0.628 |
| DAROCUR ® TPO[6] | 0.628 |
| Polybutyl acrylate, 60% in naphtha | 1.25 |
| 3-Aminopropylpropyltrimethoxysilane | 14.57 |
| Ethanol, 200 proof anhydrous | 14.57 |

[4] A blocked aliphatic polyisocyanate based on isophorone diisocyanate (IPDI) available from Covestro.
[5] A photoinitiator (bis(2,4,6-trimethylbenzoyl)-phenylphosphineoxide) available from BASF Corporation.
[6] A photoinitiator (2,4,6-trimethylbenzoyl-diphenyl-phosphineoxide) available from BASF Corporation.

Part 2—Preparation of Lens and Coating Stacks.

Finished single vision lenses (6 base, 70 mm) prepared from CR-39® monomer were used as substrates. The lenses were first corona treated by passing on a conveyor belt in a Tantec EST Systems Serial No. 020270 Power Generator HV 2000 series corona treatment apparatus with a high voltage transformer. The lenses were exposed to corona generated by 53.99 KV, 500 Watts while traveling on a conveyor at a belt speed 3 ft/min (91.4 cm/min). The lenses were in sequence, cleaned with water, cleaned with deionized water, and then dried with a stream of air. This corona/cleaning process was also repeated after each layer was applied, except where indicated or after the last layer of PTLF was applied.

Step 1. Application of Protective Layer.

After each lens was corona treated and cleaned, the PTLF was applied by spin coating at a rate of 700 revolutions per minutes (rpm) for 2 seconds and then 2000 rpm for 2.75 seconds onto the lens. Afterwards the coated substrates were cured under two ultraviolet lamps in a nitrogen atmosphere while running on a conveyor belt at 6 ft/min (183 cm/min) speed at peak intensity of 1.887 Watts/cm$^2$ of UVA and 0.694 Watts/cm$^2$ of UVV and UV dosage of 4.699 Joules/cm$^2$ of UVA and 1.787 Joules/cm$^2$ of UVV. The cured coated lens was subjected to the corona-cleaning process described above prior to the application of the LCAF.

Step 2. Application and Alignment of the Liquid Crystal Alignment Layer.

The LCAF was applied to the lens by spin-coating by dispensing approximately 2.0 mL of the solution and spinning the substrates at 500 revolutions per minute (rpm) for 2 seconds, followed by 2,400 rpm for 2 seconds. Afterwards, the coated substrates were placed in an oven maintained at 120° C. for 30 minutes. The coated substrates were cooled to about 26° C.

The dried LCAF layer was at least partially ordered by exposure to linearly polarized ultraviolet radiation. The light source was oriented such that the radiation was linearly polarized in a plane perpendicular to the surface of the substrate. The amount of ultraviolet radiation that each liquid crystal alignment layer was exposed to was measured using a UV Power Puck™ High energy radiometer from EIT, Inc. (Serial No. 2066) and was as follows: UVA 0.018 W/cm$^2$ and 5.361 J/cm$^2$; UVB 0 W/cm$^2$ and 0 J/cm$^2$; UVC 0 W/cm$^2$ and 0 J/cm$^2$; and UVV 0.005 W/cm$^2$ and 1.541 J/cm$^2$. After ordering at least a portion of the LCAF, the substrates were cooled to about 26° C. and kept covered. No corona and cleaning steps were performed prior to application of the liquid crystal coating layer.

Step 3. Application of Liquid Crystal Coating Layer.

The LCF, either red or green as indicated in Table 3, was applied by spin coating at a rate of 500 revolutions per minute (rpm) for 2 seconds, followed by 1600 rpm for 1 second onto the at least partially ordered LCAF materials on the test substrates. Each coated substrate was placed in an oven at 65° C. for 30 minutes to enable alignment of the dichroic fixed-tint dyes. Afterwards they were cured in a UV Curing Oven in a nitrogen atmosphere while running on a conveyor belt at 15.2 mm/s speed at peak intensity of 0.388 Watts/cm$^2$ of UVA and 0.5 Watts/cm$^2$ of UVV and UV dosage of 13 Joules/cm$^2$ of UVA and 17 Joules/cm$^2$ of UVV. The cured coated lenses were subjected to the corona-cleaning process described above prior to application of the next coating layer.

After completion of steps 1-3, Comparative Examples CE-1 and CE-2 were then coated with the protective coating according to Step 1 above. After curing the protective coating, an additional thermal curing cycle was applied for three hours at 87° C. prior to testing.

After completion of steps 1-3, Examples 3 and 4 (according to the present invention) were subjected to steps 1 through 3 again. In step 2, the linearly polarized radiation used during the alignment step was exposed at 90° from the orientation of the first LCAF direction. Step 3 utilized a different color LCF from the first LCF layer. The lenses of Ex-3 and Ex-4 were then coated with the protective coating according to Step 1. After curing the protective coating, an additional thermal curing cycle was applied for three hours at 87° C. prior to testing. The layering of the coatings on each of the examples and comparative examples are summarized in Table 3 below. In the following Table 3, a blank cell indicates that the particular layer was not applied/present; while an "x" indicates that the particular layer was applied/present.

TABLE 3

Coating Stack of the Lens Examples

| Lens Example | First Polarization stack | | | | Second Polarization stack | | | | | Number of coatings/layers |
|---|---|---|---|---|---|---|---|---|---|---|
| | PTLF | LCAF | LCF Red | LCF Green | PTLF | LCAF | LCF Red | LCF Green | PTLF | |
| CE-1 | x | x | x | | x | | | | | 4 |
| CE-2 | x | x | | x | x | | | | | 4 |
| Ex-3 | x | x | x | | x | x | | x | x | 7 |
| Ex-4 | x | x | | x | x | x | | | x | 7 |

Part 3—Dichroic Performance Tests Including Dichroic Ratio and Optical Measurements.

Full Polarization Measurement:

A CARY 4000 UV-Visible spectrophotometer equipped with a self-centering sample holder, was used. A UV polarizer (UVD260A, available from Moxtex, Inc.) was placed in front of the light source. The instrument was set with the following parameters: Scan speed=600 nm/min; Data interval=1.0 nm; Integration time=100 ms; Absorbance range=0-6.5; Y mode=absorbance; X-mode=nanometers and the scanning range was 370 to 800 nm. Options were set for 3.5 SBW (slit band width), and double beam mode. Baseline options were set for Zero/baseline correction. An uncoated, untreated finished single vision lens (6 base, 70 mm) prepared from CR-39® monomer was used for zero/baseline correction for all measurements. 2.5 Neutral Density filters were in the reference path for all scans. The coated substrate samples were tested in air, at ambient room temperature (73° F.±5° F.; 22.8° C.±5.6° C.).

Orientation of the sample polarizer to be parallel and perpendicular to the analyzer polarizer was determined in the following manner. Lenses were marked for alignment direction before application of LCF layer, or bottom/first layer of LCF if the lenses had two crossed LCF layers. When this marked alignment direction was perpendicular to the absorption direction of the analyzer polarizer, this position was defined as the crossed position. The parallel position was obtained by rotating the stage 90 degrees clock-wise or counter-clockwise.

The absorption spectrum was collected at both parallel and crossed positions for each sample. Data analysis was handled using the Igor Pro software package available from WaveMetrics. The spectra were loaded into the Igor Pro software package, and the absorbances were used to calculate the dichroic ratios.

Unpolarized Measurement:

Measurement was done by using the same settings in the fixed (crossed/parallel) polarization measurement, except removing the Moxtek polarizer and replacing it with a Depolarizer.

In all measurements, data was analyzed for CIE Y, a*, b* (D65 illuminant, 10-degree observer) only.

Color values for the examples according to the present invention and comparative examples are provided in Table 4 below.

With a single polarization stack, Comparative Example-1 (CE-1) was visually observed to have a red hue and showed positive CIE a* values in both the unpolarized measurement and the polarized measurements (crossed polarization and parallel polarization). Comparative Example-2 (CE-2) was visually observed to have a green hue and showed negative CIE a* values in both the unpolarized measurement and the polarized measurements (crossed polarization and parallel polarization). The switch from cross polarization measurement to parallel polarization measurement changed the magnitude of the CIE a* values, but not much change in the visual hue was observed by naked eye.

With crossed double polarization stacks, both Example 3 (Ex-3) and Example 4 (Ex-4) showed close to neutral gray colors (hues) as observed from CIE a* and CIE b* values under unpolarized measurement. However, under polarized measurement: most of the color from one of the polarization stacks was detected under the crossed polarization measurement; and most of the color from the other polarization stack was detected under the parallel polarization measurement. The detected color depended on the position of the lens relative to the absorption direction of the analyzer polarizer. This was observed from the CIE a* value changes: from +29.82 (crossed polarization) to −16.92 (parallel polarization) for Example 3; and from +30.5 (parallel polarization) to −16.43 (crossed polarization) for Example 4.

Absorption and dichroic (dichroic ratio, DR) results are summarized in the following Table 5.

TABLE 5

Absorption and Dichroic Ratio (DR) Results

| Lens | Polarization | Absorption at 544 nm | Absorption at 675 nm | DR 544 nm | DR 675 nm |
|---|---|---|---|---|---|
| CE-1 | Crossed | 2.11 | 0.41 | 4.9 | 3.7 |
| | Parallel | 0.43 | 0.11 | | |
| | Unpolarized (calculated) | 0.72 | 0.23 | | |
| CE-2 | Crossed | 0.33 | 1.16 | 3.0 | 4.3 |
| | Parallel | 0.11 | 0.27 | | |
| | Unpolarized (calculated) | 0.21 | 0.52 | | |

TABLE 4

Color Measurement Values of Lens Examples

| Lens Example | Unpolarized | | | Crossed Polarization | | | Parallel Polarization | | |
|---|---|---|---|---|---|---|---|---|---|
| | CIE Y | CIE a* | CIE b* | CIE Y | CIE a* | CIE b* | CIE Y | CIE a* | CIE b* |
| CE-1 | 22.59 | 18.02 | 2.79 | 2.90 | 38.42 | −4.50 | 42.27 | 16.27 | 4.53 |
| CE-2 | 54.97 | −19.85 | 4.93 | 36.85 | −33.87 | 2.05 | 73.08 | −12.10 | 6.89 |
| Ex-3 | 8.64 | −4.72 | 0.08 | 2.01 | 29.82 | −3.32 | 15.27 | −16.92 | 1.03 |
| Ex-4 | 8.80 | −4.75 | 1.23 | 15.74 | −16.43 | 2.34 | 1.85 | 30.50 | −2.58 |

TABLE 5-continued

Absorption and Dichroic Ratio (DR) Results

| Lens | Polarization | Absorption at 544 nm | Absorption at 675 nm | DR 544 nm | DR 675 nm |
|---|---|---|---|---|---|
| Ex-3 | Crossed | 2.17 | 0.66 | 3.0 | −1.9 |
| | Parallel | 0.73 | 1.26 | | |
| | Unpolarized (calculated) | 1.02 | 0.86 | | |
| Ex-4 | Crossed | 0.72 | 1.22 | −3.1 | 1.8 |
| | Parallel | 2.24 | 0.67 | | |
| | Unpolarized (calculated) | 1.01 | 0.86 | | |

In Table 5, the polarized absorbance values at 544 nm and 675 nm are from the data collected directly from the CARY 4000 UV-Visible spectrophotometer. The average absorbance values are calculated from this data by converting the absorbance values to transmission values, averaging the 2 values, and then converting those values back into absorbance.

Comparative Example-1 (CE-1) had a single major absorption at 544 nm in the visible region, and Comparative Example-2 (CE-2) had a single major absorption at 675 nm in the visible region, in each case when measured under crossed polarization conditions, parallel polarization conditions, or unpolarized conditions.

Example 3 and Example 4 each showed a different pattern of visible absorption when measured under different polarization conditions. Example 3 had a maximum absorption: at a wavelength of 544 nm under crossed polarization conditions; and at a wavelength of 675 nm under parallel polarization conditions. Example 4 had a maximum absorption at: a wavelength of 675 nm under cross polarization conditions; and at a wavelength of 544 nm under parallel polarization conditions.

The dichroic ratio (DR) at individual wavelength (544 nm and 675 nm) was calculated using two absorption numbers at either crossed polarization or parallel polarization conditions. The value (ratio) is determined with (i) the larger number as the numerator and (ii) the smaller number as the denominator. The positive and negative signs represent the direction of polarization. If the absorption under conditions of crossed polarization is of larger magnitude than under conditions of parallel polarization, the number has a positive sign. A negative number means the absorption under conditions of crossed polarization has a lower magnitude than under conditions of parallel polarization.

When visually examined by human eyes against a background of polarized light, such as a LCD computer screen, the lenses of Example-3 and Example-4 each showed a red hue in a first position, but a green hue in a second position (the second position being 90° relative to the first position). Visually examined by human eyes against a background of unpolarized light, the lenses of Example-3 and Example-4 each showed a hue close to neutral gray.

Visually examined by human eyes in outdoor conditions against a background of mixed polarized glare and unpolarized light, at certain lens positions, the lenses of Example-3 and Example-4 showed a red hue in areas where there was polarized glare. In areas where there was no or a low level of polarized glare, the lenses of Example-3 and Example-4 had (or provided) a hue of close to neutral gray in those areas. At the second lens position (that is 90° to the first lens position), the lenses of Example-3 and Example-4 each showed a green hue in those areas where there was a polarized glare. In areas where there was no or a low level of polarized glare, the lenses of Example-3 and Example-4 had (or provided) a hue close to neutral gray in those areas.

The present invention can be further characterized by one or more of the following non-limiting clauses:

Clause 1: A polarizing article comprising:

(a) a substrate comprising a first surface and a second surface;

(b) a first orientation facility residing over said first surface of said substrate, said first orientation facility having a first orientation direction;

(c) a first polarized layer residing over said first orientation facility, said first polarized layer comprising a first dichroic fixed-tint dye and a first liquid crystal material, said first polarized layer being aligned at least partially with said first orientation direction of said first orientation facility, wherein said first polarized layer has a first polarization axis;

(d) a second orientation facility residing over said first polarized layer, said second orientation facility having a second orientation direction; and (e) a second polarized layer residing over said second orientation facility, said second polarized layer comprising a second dichroic fixed-tint dye and a second liquid crystal material, said second polarized layer being aligned at least partially with said second orientation direction of said second orientation facility, wherein said second polarized layer has a second polarization axis, wherein said first polarization axis and said second polarization axis are oriented relative to each other at an angle of greater than 0° and less than or equal to 90°, and wherein said first dichroic fixed-tint dye has a first electromagnetic absorption spectrum, said second dichroic fixed-tint dye has a second electromagnetic absorption spectrum, and said first electromagnetic absorption spectrum and said second electromagnetic absorption spectrum are different from each other.

Clause 2. The polarizing article of clause 1 wherein, said first electromagnetic absorption spectrum comprises a first visible light absorption spectrum, said second electromagnetic absorption spectrum comprises a second visible light absorption spectrum, and said first visible light absorption spectrum and said second visible light absorption spectrum are different from each other.

Clause 3. The polarizing article of clause 1 or 2, wherein said first liquid crystal material and said second liquid crystal material are each independently a thermotropic liquid crystal material.

Clause 4. The polarizing article of any of clauses 1 to 3, wherein said first liquid crystal material and said second liquid crystal material are each independently selected from liquid crystal polymers, liquid crystal pre-polymers, liquid crystal monomers, liquid crystal mesogens, and combinations thereof.

Clause 5. The polarizing article of any of clauses 1 to 4, wherein said first orientation facility and said second orientation facility are each independently selected from: a layer comprising an alignment medium; an ordered polymer sheet; a treated surface; a Langmuir-Blodgett film; and combinations thereof.

Clause 6. The polarizing article of any of clauses 1 to 5, wherein said first dichroic fixed-tint dye and said second dichroic fixed-tint dye are each independently selected from, azomethines, indigoids, thioindigoids, merocyanines, indans, quinophthalonic dyes, perylenes, phthaloperines, triphenodioxazines, indoloquinoxalines, imidazo-triazines, tetrazines, azo dyes, (poly)azo dyes, benzoquinones, naphthoquinones, anthraquinone and (poly)anthraquinones, anthrapyrimidinones, iodine, iodides, and combinations of two or more thereof.

Clause 7. The polarizing article of any of clauses 1 to 6, wherein said substrate comprises a fixed-tint dye.

Clause 8. The polarizing article of clause 7, wherein said fixed-tint dye is selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and combinations thereof.

Clause 9. The polarizing article of any of clauses 1 to 8, wherein said first polarized layer and said second polarized layer each independently further comprise an additive independently selected from fixed-tint dyes, photochromic materials, alignment promoters, horizontal alignment agents, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, and combinations of two or more thereof.

Clause 10. The polarizing article of any of clauses 1 to 9, further comprising a topcoat layer residing over said second polarized layer, said topcoat layer comprising an ultraviolet light absorber.

Clause 11. The polarizing article of clause 10, further comprising a hardcoat layer residing over said topcoat layer.

Clause 12. The polarizing article of any of clauses 1 to 11, wherein said first surface of said substrate is defined by a primer layer.

Clause 13. The polarizing article of any of clauses 1 to 12, further comprising a birefringent layer residing over said first polarized layer, wherein said birefringent layer is interposed between said first polarized layer and said second orientation facility.

Clause 14. The polarizing article of any of clauses 1 to 13, wherein said polarizing article is selected from ophthalmic articles, display articles, windows, mirrors, optical filters, active liquid crystal cell articles, and passive liquid crystal cell articles.

Clause 15. The polarizing article of any of clauses 1 to 14, wherein said polarizing article is selected from ophthalmic articles, the ophthalmic articles being selected from corrective lenses, non-corrective lenses, contact lenses, intraocular lenses, magnifying lenses, protective lenses, and visors.

Clause 16. The polarizing article of any of clauses 1 to 14, wherein said polarizing article is selected from display articles, the display articles being selected from screens, monitors, and security elements.

Clause 17: A method of forming a polarizing article comprising:

(a) providing a substrate comprising a first surface and a second surface;

(b) forming a first orientation facility over said first surface of said substrate, said first orientation facility having a first orientation direction;

(c) forming, over said first orientation facility, a first polarized layer comprising a first dichroic fixed-tint dye and a first liquid crystal material, and aligning said first polarized layer at least partially with said first orientation direction of said first orientation facility, wherein said first polarized layer has a first polarization axis;

(d) forming a second orientation facility over said first polarized layer, said second orientation facility having a second orientation direction; and (e) forming, over said second orientation facility, a second polarized layer comprising a second dichroic fixed-tint dye and a second liquid crystal material, and aligning said second polarized layer at least partially with said second orientation direction of said second orientation facility, wherein said second polarized layer has a second polarization axis, wherein said first polarization axis and said second polarization axis are oriented relative to each other at an angle of greater than 0° and less than or equal to 90°, and wherein said first dichroic fixed-tint dye has a first electromagnetic absorption spectrum, said second dichroic fixed-tint dye has a second electromagnetic absorption spectrum, and said first electromagnetic absorption spectrum and said second electromagnetic absorption spectrum are different from each other.

Clause 18: The method of clause 17 wherein, said first electromagnetic absorption spectrum comprises a first visible light absorption spectrum, said second electromagnetic absorption spectrum comprises a second visible light absorption spectrum, and said first visible light absorption spectrum and said second visible light absorption spectrum are different from each other.

Clause 19: The method of clauses 17 or 18, wherein said first liquid crystal material and said second liquid crystal material are each independently a thermotropic liquid crystal material.

Clause 20: The method of any of any of clauses 17 to 19, wherein said first liquid crystal material and said second liquid crystal material are each independently selected from liquid crystal polymers, liquid crystal pre-polymers, liquid crystal monomers, liquid crystal mesogens, and combinations thereof.

Clause 21: The method of any of clauses 17 to 20, wherein said first orientation facility and said second orientation facility are each independently selected from: a layer comprising an alignment medium; an ordered polymer sheet; a treated surface; a Langmuir-Blodgett film; and combinations thereof.

Clause 22: The method of any of clauses 17 to 21, wherein said first dichroic fixed-tint dye and said second dichroic fixed-tint dye are each independently selected from, azomethines, indigoids, thioindigoids, merocyanines, indans, quinophthalonic dyes, perylenes, phthaloperines, triphenodioxazines, indoloquinoxalines, imidazo-triazines, tetrazines, azo dyes, (poly)azo dyes, benzoquinones, naphthoquinones, anthraquinone and (poly)anthraquinones, anthrapyrimidinones, iodine, iodides, and combinations of two or more thereof.

Clause 23: The method of any of clauses 17 to 22, further comprising, at least partially setting said first polarized layer, after aligning said first polarized layer at least partially with said first orientation direction of said first orientation facility, and prior to forming said second orientation facility, and at least partially setting said second polarized layer after aligning said second polarized layer at least partially with said second orientation direction of said second orientation facility.

Clause 24: The method of any of clauses 17 to 23, wherein said substrate comprises a fixed-tint dye.

Clause 25: The method of clause 24, wherein said fixed-tint dye is selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and combinations thereof.

Clause 26: The method of any of clauses 17 to 25, wherein said first polarized layer and said second polarized layer each independently further comprise an additive independently selected from fixed-tint dyes, photochromic materials, alignment promoters, horizontal alignment agents, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, and combinations of two or more thereof.

Clause 27: The method of any of clauses 17 to 26, further comprising:
forming a topcoat layer over said second polarized layer, said topcoat layer comprising an ultraviolet light absorber; and
optionally forming a hardcoat layer over said topcoat layer.

Clause 28: The method of any of clauses 17 to 27, wherein said first surface of said substrate is defined by a primer layer.

Clause 29: The method of any of clauses 17 to 28, further comprising forming a birefringent layer over said first polarized layer, wherein said birefringent layer is interposed between said first polarized layer and said second orientation facility.

Clause 30: The method of any of clauses 17 to 29, wherein said polarizing article is selected from ophthalmic articles, display articles, windows, mirrors, optical filters, active liquid crystal cell articles, and passive liquid crystal cell articles.

Clause 31: The method of any of clauses 17 to 30, wherein said polarizing article is selected from ophthalmic articles, the ophthalmic articles being selected from corrective lenses, non-corrective lenses, contact lenses, intra-ocular lenses, magnifying lenses, protective lenses, and visors.

Clause 32: The method of any of clauses 17 to 30, wherein said polarizing article is selected from display articles, the display articles being selected from screens, monitors, and security elements.

The present invention has been described with reference to specific details of particular embodiments thereof. It is not intended that such details be regarded as limitations upon the scope of the invention except insofar as and to the extent that they are included in the accompanying claims.

What is claimed is:

1. A polarizing article comprising:
(a) a substrate comprising a first surface and a second surface;
(b) a first orientation facility residing over said first surface of said substrate, said first orientation facility having a first orientation direction;
(c) a first polarized layer residing over said first orientation facility, said first polarized layer comprising a first dichroic fixed-tint dye and a first liquid crystal material, said first polarized layer being aligned at least partially with said first orientation direction of said first orientation facility, wherein said first polarized layer has a first polarization axis;
(d) a second orientation facility residing over said first polarized layer, said second orientation facility having a second orientation direction; and
(e) a second polarized layer residing over said second orientation facility, said second polarized layer comprising a second dichroic fixed-tint dye and a second liquid crystal material, said second polarized layer being aligned at least partially with said second orientation direction of said second orientation facility, wherein said second polarized layer has a second polarization axis,
wherein said first polarization axis and said second polarization axis are oriented relative to each other at an angle of greater than 0° and less than or equal to 90°,
wherein said first dichroic fixed-tint dye has a first electromagnetic absorption spectrum, said second dichroic fixed-tint dye has a second electromagnetic absorption spectrum, and said first electromagnetic absorption spectrum and said second electromagnetic absorption spectrum are different from each other, and
wherein said substrate, said first orientation facility, said first polarized layer, said second orientation facility, and said second polarized layer, are in each case free of a photochromic-dichroic compound.

2. The polarizing article of claim 1 wherein,
said first electromagnetic absorption spectrum comprises a first visible light absorption spectrum,
said second electromagnetic absorption spectrum comprises a second visible light absorption spectrum, and
said first visible light absorption spectrum and said second visible light absorption spectrum are different from each other.

3. The polarizing article of claim 1, wherein said first liquid crystal material and said second liquid crystal material are each independently a thermotropic liquid crystal material.

4. The polarizing article of claim 1, wherein said first liquid crystal material and said second liquid crystal material are each independently selected from liquid crystal polymers, liquid crystal pre-polymers, liquid crystal monomers, liquid crystal mesogens, and combinations thereof.

5. The polarizing article of claim 1, wherein said first orientation facility and said second orientation facility are each independently selected from: a layer comprising an alignment medium; an ordered polymer sheet; a treated surface; a Langmuir-Blodgett film; and combinations thereof.

6. The polarizing article of claim 1, wherein said first dichroic fixed-tint dye and said second dichroic fixed-tint dye are each independently selected from, azomethines, indigoids, thioindigoids, merocyanines, indans, quinophthalonic dyes, perylenes, phthaloperines, triphenodioxazines, indoloquinoxalines, imidazo-triazines, tetrazines, azo dyes, (poly)azo dyes, benzoquinones, naphthoquinones, anthraquinone and (poly)anthraquinones, anthrapyrimidinones, iodine, iodides, and combinations of two or more thereof.

7. The polarizing article of claim 1, wherein said substrate comprises a fixed-tint dye.

8. The polarizing article of claim 7, wherein said fixed-tint dye is selected from azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, polyene dyes, and combinations thereof.

9. The polarizing article of claim 1, wherein said first polarized layer and said second polarized layer each independently further comprise an additive independently selected from fixed-tint dyes, photochromic materials, alignment promoters, horizontal alignment agents, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, and combinations of two or more thereof.

10. The polarizing article of claim 1, further comprising a topcoat layer residing over said second polarized layer, said topcoat layer comprising an ultraviolet light absorber, wherein said topcoat layer is free of a photochromic-dichroic compound.

11. The polarizing article of claim 10, further comprising a hardcoat layer residing over said topcoat layer, wherein said hardcoat layer is free of a photochromic-dichroic compound.

12. The polarizing article of claim 1, wherein said first surface of said substrate is defined by a primer layer, and wherein said primer layer is free of a photochromic-dichroic compound.

13. The polarizing article of claim 1, further comprising a birefringent layer residing over said first polarized layer, wherein said birefringent layer is interposed between said first polarized layer and said second orientation facility, and wherein said birefringent layer is free of a photochromic-dichroic compound.

14. The polarizing article of claim 1, wherein said polarizing article is selected from ophthalmic articles, display articles, windows, mirrors, optical filters, active liquid crystal cell articles, and passive liquid crystal cell articles.

15. A method of forming a polarizing article comprising:
(a) providing a substrate comprising a first surface and a second surface;
(b) forming a first orientation facility over said first surface of said substrate, said first orientation facility having a first orientation direction;
(c) forming, over said first orientation facility, a first polarized layer comprising a first dichroic fixed-tint dye and a first liquid crystal material, and aligning said first polarized layer at least partially with said first orientation direction of said first orientation facility, wherein said first polarized layer has a first polarization axis;
(d) forming a second orientation facility over said first polarized layer, said second orientation facility having a second orientation direction; and
(e) forming, over said second orientation facility, a second polarized layer comprising a second dichroic fixed-tint dye and a second liquid crystal material, and aligning said second polarized layer at least partially with said second orientation direction of said second orientation facility, wherein said second polarized layer has a second polarization axis,
wherein said first polarization axis and said second polarization axis are oriented relative to each other at an angle of greater than 0° and less than or equal to 90°,
wherein said first dichroic fixed-tint dye has a first electromagnetic absorption spectrum, said second dichroic fixed-tint dye has a second electromagnetic absorption spectrum, and said first electromagnetic absorption spectrum and said second electromagnetic absorption spectrum are different from each other, and
wherein said substrate, said first orientation facility, said first polarized layer, said second orientation facility, and said second polarized layer, are in each case free of a photochromic-dichroic compound.

* * * * *

UNITED STATES PATENT AND TRADEMARK OFFICE
CERTIFICATE OF CORRECTION

PATENT NO. : 10,884,288 B2  
APPLICATION NO. : 16/471887  
DATED : January 5, 2021  
INVENTOR(S) : Meng He et al.

Page 1 of 1

It is certified that error appears in the above-identified patent and that said Letters Patent is hereby corrected as shown below:

In the Claims

Column 42, Line 56, Claim 8, delete "azime" and insert -- azine --

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*